(12) United States Patent
Kimura et al.

(10) Patent No.: US 6,827,454 B2
(45) Date of Patent: Dec. 7, 2004

(54) IMAGING PREVENTION METHOD AND SYSTEM

(75) Inventors: Katsumi Kimura, Kanagawa (JP); Shinya Kataoka, Tokyo (JP); Norifumi Zushi, Tokyo (JP); Yuko Kudo, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/454,120

(22) Filed: Jun. 4, 2003

(65) Prior Publication Data

US 2003/0214640 A1 Nov. 20, 2003

Related U.S. Application Data

(62) Division of application No. 10/058,688, filed on Jan. 28, 2002.
(60) Provisional application No. 60/291,404, filed on May 16, 2001.

(30) Foreign Application Priority Data

May 16, 2001 (JP) ........................................ 2001-146887

(51) Int. Cl.[7] ........................ G03B 21/00; G03B 21/26; G09B 27/00
(52) U.S. Cl. ........................... 353/122; 353/94; 434/286
(58) Field of Search ..................... 353/122, 94; 434/286

(56) References Cited

U.S. PATENT DOCUMENTS

| 5,210,604 | A | * | 5/1993 | Carpenter | .................... 348/61 |
| 6,018,374 | A | * | 1/2000 | Wrobleski | .................. 348/744 |
| 6,454,415 | B1 | * | 9/2002 | Vlahos | ........................ 353/30 |
| 6,460,999 | B1 | * | 10/2002 | Suzuki | ......................... 353/79 |
| 2002/0171813 | A1 | * | 11/2002 | Kimura et al. | .............. 353/122 |

FOREIGN PATENT DOCUMENTS

| JP | 07-131764 | 5/1995 | ............ H04N/7/14 |
| JP | 08-226793 | 9/1996 | .............. F41J/5/04 |

* cited by examiner

*Primary Examiner*—Russell Adams
*Assistant Examiner*—Melissa J Koval
(74) *Attorney, Agent, or Firm*—Frommer Lawrence & Haug LLP; William S. Frommer; Dennis M. Smid

(57) ABSTRACT

As an imaging prevention method for interfering unauthorized imaging of a number of visual images projected on a screen, there is employed a method for projecting infrared light to a viewer/audience direction from at least one or more infrared light projector devices. According to the method, infrared light may be directly incident into an imaging apparatus of a person conducting an unauthorized copying act so as to adversely affect the unauthorized copying.

14 Claims, 23 Drawing Sheets

FIG.10
- ⊙ MOVIE THEATER ID : 001
- ⊙ EMISSION CODE : 10001110010
- ⊙ EMISSION PATTERN
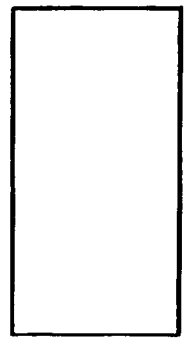
FOR "1"
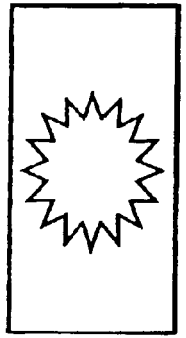
FOR "0"
⊙ VISUAL IMAGE OF RECORDED PICTURES (10001110010)
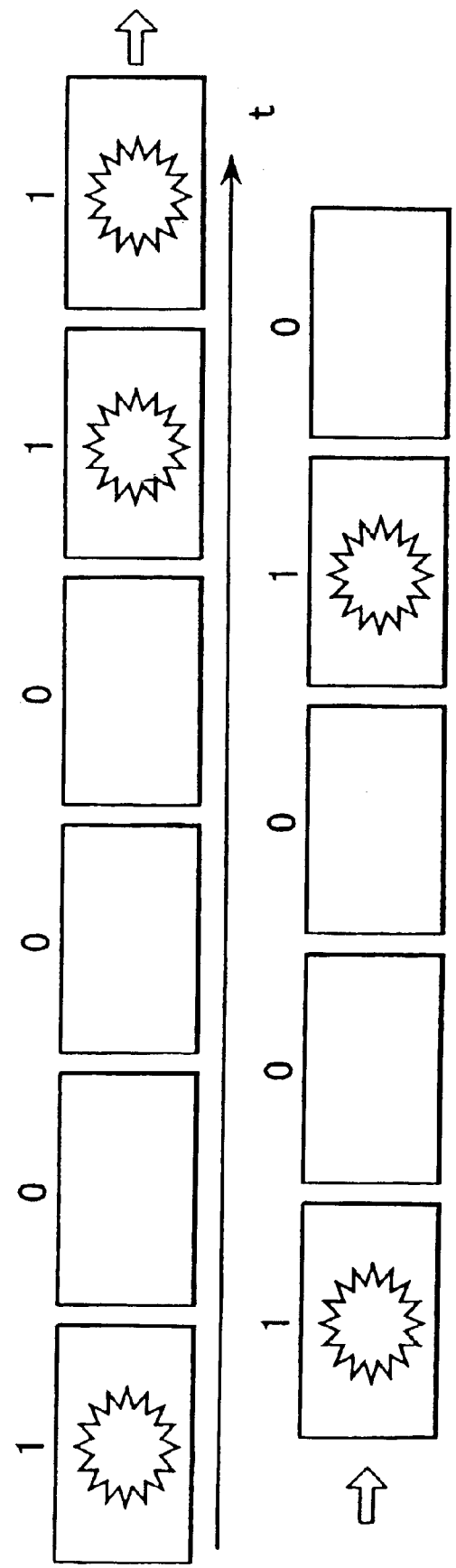

FIG.11

⊚ MOVIE THEATER ID : 001

⊚ EMISSION CODE : 10001110010

⊚ EMISSION PATTERN

DURING 1t → 3t → DURING 3t → 2t → DURING 1t

⊚ VISUAL IMAGE OF RECORDED PICTURES 1 1 0 0 0 0 1 1 1 0 0 1 0

FIG.12

- ⊙ MOVIE THEATER ID : 001
- ⊙ EMISSION CODE : 01001101
- ⊙ EMISSION PATTERN : (INFRARED EMISSION APPARATUS 1) 11111111
  (INFRARED EMISSION APPARATUS 2) 10110010

EMISSION APPARATUS 1 : 1    1    1    1
EMISSION APPARATUS 2 : 1    0    1    1

EMISSION APPARATUS 1 : 1    1    1    1
EMISSION APPARATUS 2 : 0    0    1    0

FIG.14
◎ MOVIE THEATER ID : 001
◎ IDENTIFICATION PATTERN 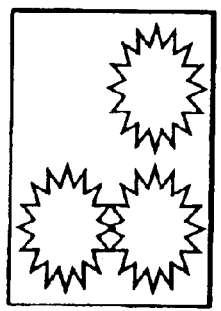
◎ VISUAL IMAGE OF RECORDED PICTURES
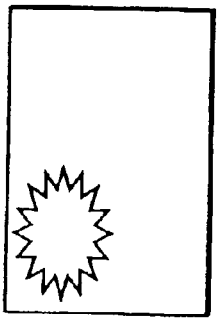 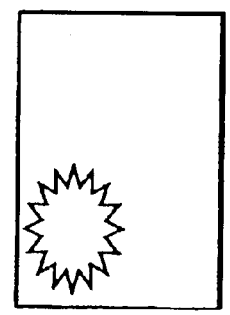 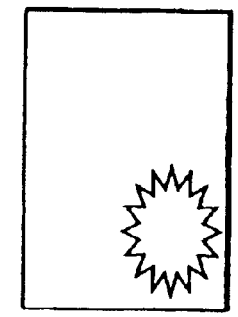
t
◎ AFTER TIME COMPRESSION 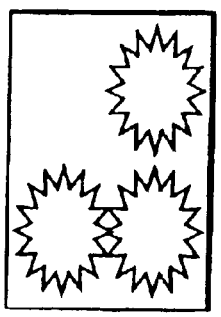

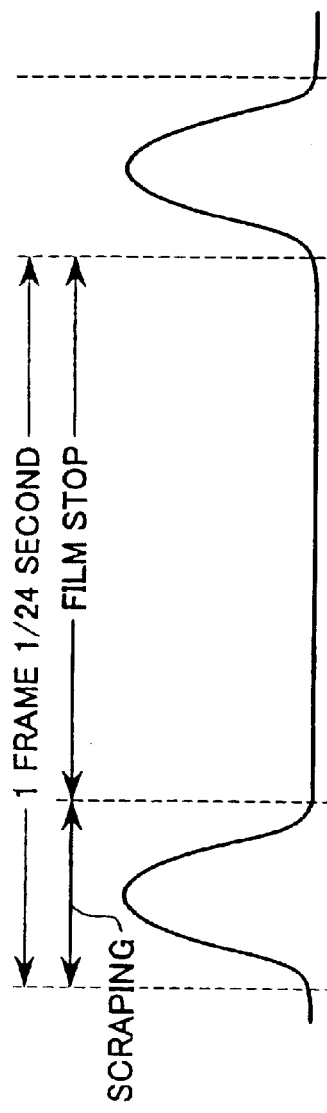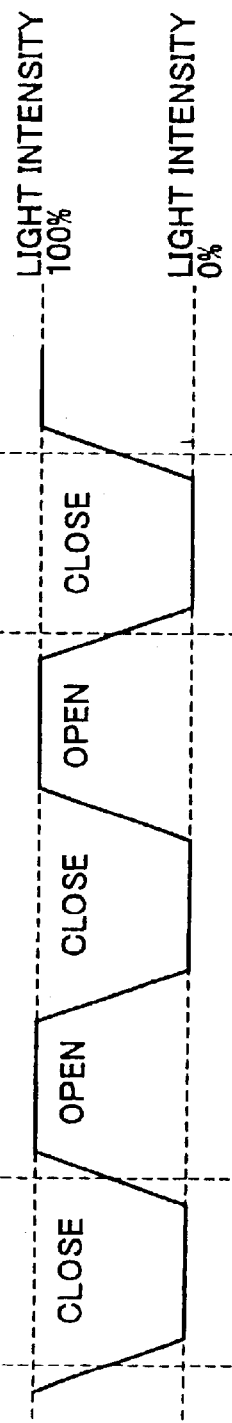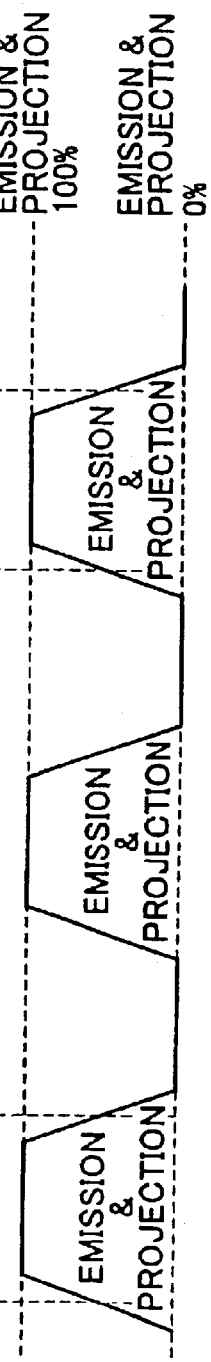

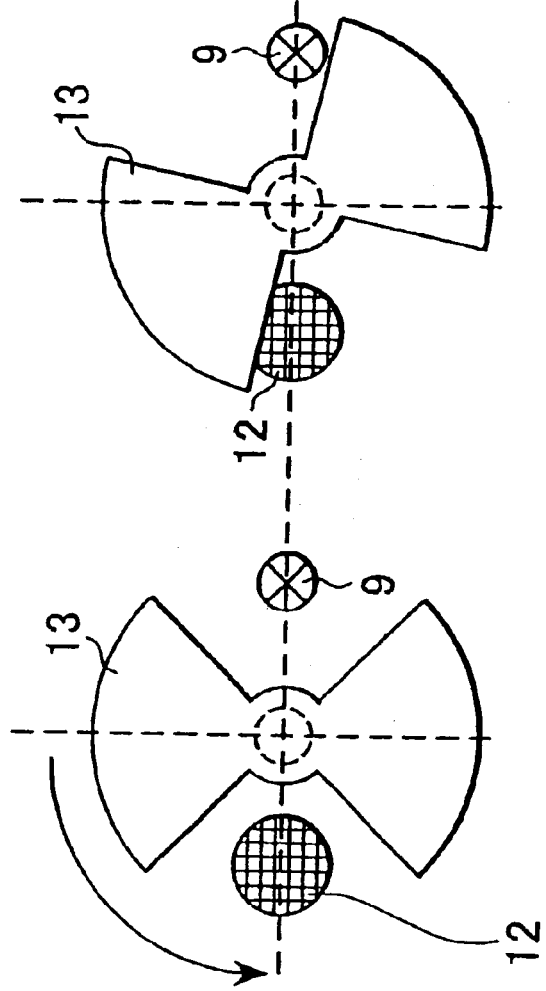

EXAMPLE OF WHOLE SURFACE EMISSION

EXAMPLE OF PARTIAL EMISSION

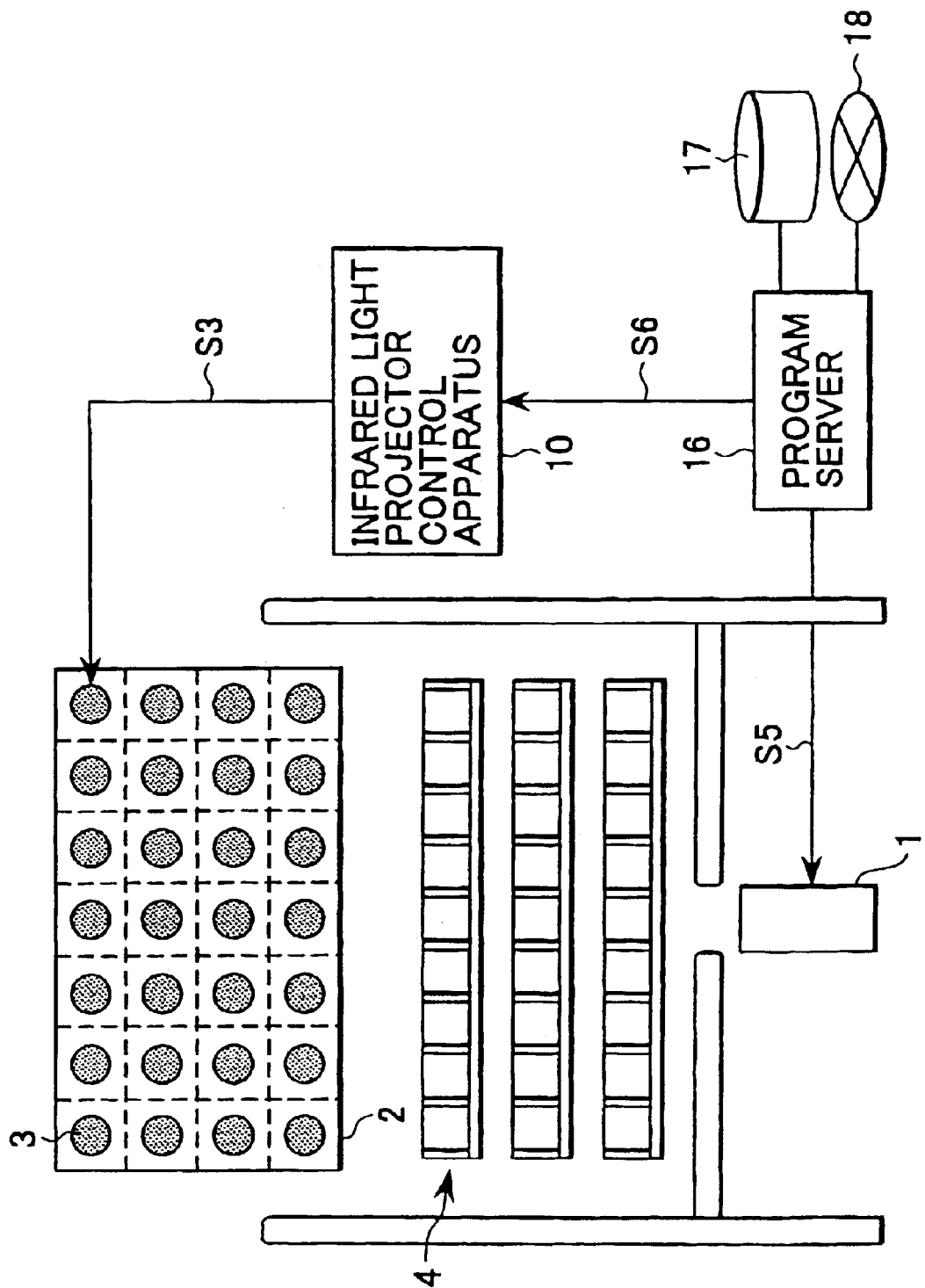

IMAGING PREVENTION METHOD AND SYSTEM

This application is a divisional of application Ser. No. 10/058,688, filed on Jan. 28, 2002, which application claims the benefit of provisional application Ser. No. 60/291,404, filed May 16, 2001 the contents of these applications being hereby incorporated by reference.

RELATED APPLICATION DATA

This application claims priority to provisional application 60/291,414, and the disclosure of that application is incorporated herein by reference to the extent permitted by law.

BACKGROUND OF THE INVENTION

1. Field of the Invention

The present invention relates to technology for interfering unauthorized copy of visual images shown on a screen of a visual image system.

2. Description of the Related Art

Following technique is disclosed as means to interfere such an unauthorized copy. The technique has been developed to utilize difference between visual characteristic of human eyes and image characteristic of imaging apparatus such as cameras, and employs infrared light to realize means to interfering the unauthorized copy. More specifically, infrared light is projected onto a screen surface from an infrared light projector disposed at a vicinity of an visual image projector or other remote position so as that infrared light reflected on the screen surface can be incident into the imaging apparatus of a person conducting the unauthorized act of copying the visual image appearing on the screen. In other words, an infrared light visual image, which is irrelevant to the main feature of visual images, is inevitably recorded on the visual image that is obtained in the unauthorized manner. Accordingly, overall quality of visual images recorded through the unauthorized manner are degraded. Sometime, such a degraded visual image enables to determine a location where the unauthorized act is taken place. Of course, viewer/audiences would not be affected by the interfering means and can enjoy the feature presentation of visual images appeared on the screen since infrared light can not be recognized by human eyes.

SUMMARY OF THE INVENTION

However, a reflection ratio of infrared light in a conventional cinema screen is not high enough. Accordingly, it is difficult to materialize desirable effect in a conventional system described above because of the low reflection ratio in the cinema screen as well as lengthy infrared light path between the screen and the infrared light projector disposed at the vicinity of the visual image projector. Further, there is a technical problem of that relatively high output power is required for the infrared projector so as to provide any significant effects on the visual images that are illegally recorded.

The present invention addresses the above-mentioned problems. It would be desirable to provide a practical technique capable of producing equal or more effective prevention effect than the conventional one while using an infrared light projector apparatus of a lower power.

According to the present invention, following means are provided.

(A) As a first means, the following technique is provided. In the technique, infrared light is projected to a viewer/audience direction from one or more infrared light projector means disposed at a screen side whereby enabling the infrared light to be incident into imaging means of a person conducting the unauthorized act. In embodiments of the present invention, the infrared light projector means may be realized in various configurations that include an infrared light projector apparatus, an infrared light projector, an infrared light emitting diode or any other device/apparatus/system capable of projecting infrared light. Furthermore, in embodiment of the present invention, the imaging means may be a camera, camcorder, video recorder or any other device/system comprising an image sensor capable of obtaining image data. The technique will eliminate needs of reflecting infrared light projected onto a screen surface of poor reflection ratio. Accordingly, the projected infrared light may be effectively incident into the imaging means of a person conducting the unauthorized act. That is, ample intensity of the infrared light may be radiated into the imaging means even when the low power infrared light projector apparatus is used.

(B) As a second means, another technique is provided. In the another technique, infrared light is actively reflected by an infrared light reflection means so as that the reflected infrared light may be incident into imaging means of a person conducting the unauthorized act. In embodiments of the present invention, the infrared light reflection means may be an infrared light mirror or any other device/apparatus/member capable of reflecting infrared light. The technique also will eliminate needs of reflecting infrared light projected onto a screen surface of poor reflection ratio. Accordingly, the projected infrared light may be effectively incident into the imaging means of a person conducting the unauthorized act. That is, ample intensity of the infrared light may be incident into the imaging means even when the low power infrared light projector apparatus is used.

(C) As a third means, still another technique is provided. In the still another technique, infrared light is intermittently emitted instead of continuous emission. Various advantages are realized by the intermittent emission. For example, a location in which the visual image piracy was taken place may be identified in case that the infrared light intermittent emission is outputted in accordance with a predetermined information. Alternatively, an emission intensity of infrared light may be frequently changed whereby enabling to degrade quality of visual images illegally recorded so much as that viewing of visual images recorded in the unauthorized manner becomes impossible due to the rapid change of intensity level.

(D) As a fourth means, still another technique is provided. In the still another technique, infrared light is selectively projected onto an area or areas of the screen surface, in which brightness is lower (for example, area or time period having a brightness of the screen surface equal or less than a predetermined value). The technique allows to emit or increase an amount of infrared light in a part where an amount of the visual image light is low whereby enabling to increase relative effects of the infrared light. Accordingly, more effective prevention of the visual image piracy may be possible. Further, in case that certain information is superposed on the infrared light, such information is surely recorded on the visual images illegally recorded.

(E) As a fifth means, still another technique is provided. In the still another technique, infrared light is projected from a plurality of infrared light projector means disposed in the vicinity of a screen whereby having the reflected infrared light be incident into imaging means of a person conducting the unauthorized act. The technique uses the similar principle as that of the conventional technique except the infrared light projector apparatus in the present embodiment are selectively disposed in the vicinity of the screen. Accordingly, the reflected infrared light may be significantly increased whereby enabling to promote the prevention effect further.

BRIEF DESCRIPTION OF THE DRAWINGS

The other objects, features and advantages of the present invention will become more apparent from the following description of the presently preferred exemplary embodiments of the invention taken in conjunction with the accompanying drawings, in which:

FIG. 10 is a schematic diagram illustrating an example of emission pattern (part 1) for a case in which infrared light is emitted intermittently;

FIG. 11 is a schematic diagram illustrating an example of emission pattern (part 2) for a case in which infrared light is emitted intermittently;

FIG. 12 is a schematic diagram illustrating an example of emission pattern (part 3) for a case in which infrared light is emitted intermittently;

FIG. 14 is a schematic diagram illustrating an example of emission pattern (part 5) for a case in which infrared light is emitted intermittently;

FIG. 18 is a schematic diagram illustrating relationship between shutter operation and projection operation of infrared light;

FIG. 19 is a schematic diagram illustrating an example of shutter sensor arrangement;

FIG. 21 is a schematic diagram illustrating one embodiment (part 2) wherein infrared light is selectively projected onto scene or area in the screen of low brightness;

Figure 1:
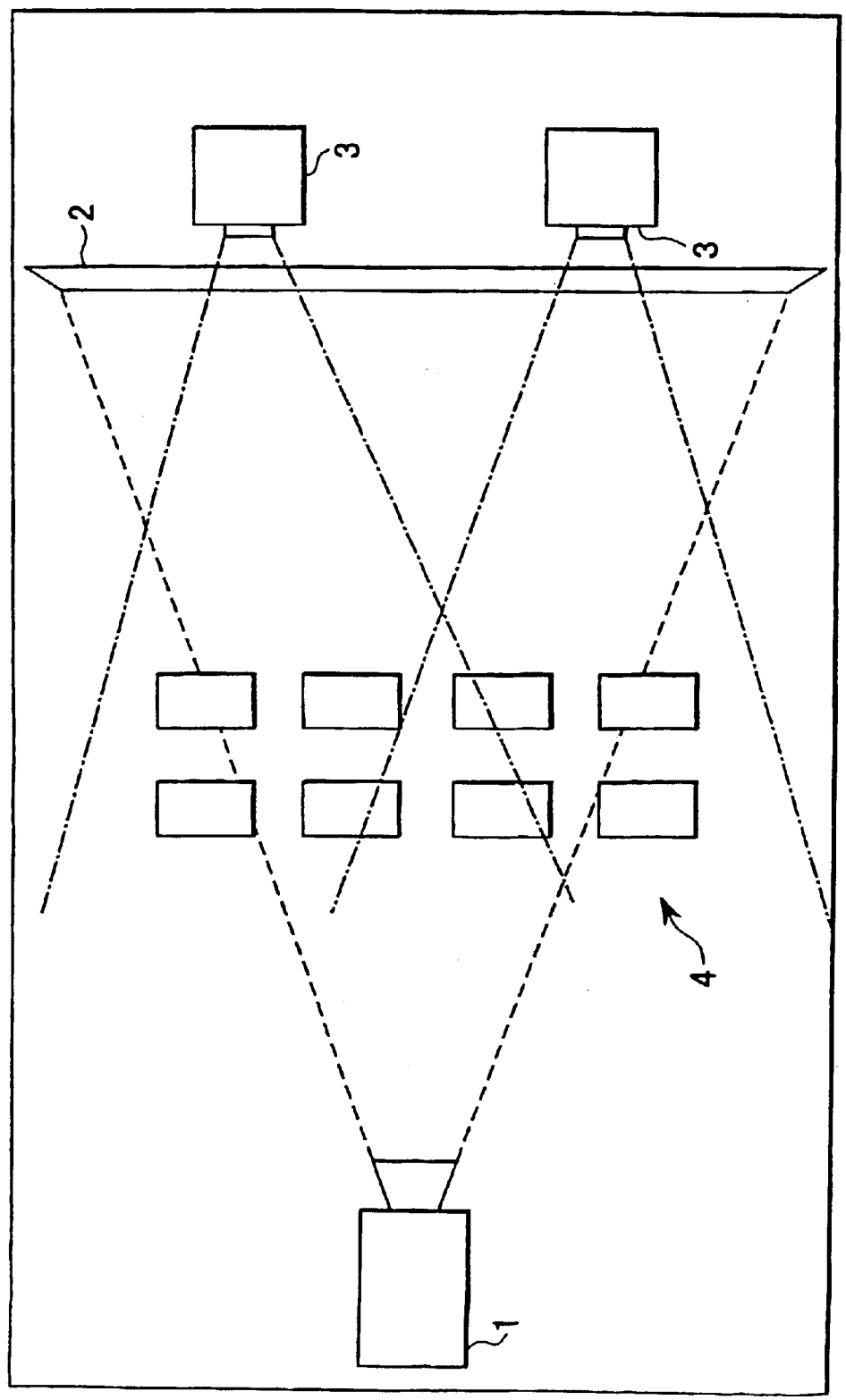
FIG. 1 is a schematic diagram illustrating one embodiment (part 1) wherein infrared light is projected to a viewer/audience direction from a rear side of a screen.

DESCRIPTION OF THE PREFERRED EMBODIMENTS (A) Conceptual Embodiment

First, conceptual embodiments of a imaging prevention method and system in accordance with the present invention will now be described.

(1) As a method for interfering unauthorized imaging of visual images projected onto a screen, the following is provided. The method comprises the steps of: disposing at least one or more infrared light projector means at a rear side of the screen or the other side of the screen from the viewer/audiences; and projecting infrared light from the at least one or more infrared light projector means to a viewer/audience direction whereby enabling the infrared light to enter an imaging means of a person conducting the unauthorized act.

The method will eliminate needs of reflecting infrared light at a screen surface of poor reflection ratio. Accordingly, the projected infrared light may be effectively incident into the imaging means of a person conducting the visual image piracy. Further, ample intensity of the infrared light may be radiated into the imaging means even when the low power infrared light projector means is used.

Various methods for projecting infrared light may be contemplated. For example, the various methods may include a method for projecting infrared light by letting at least a part of the infrared light pass through space besides the screen, a method for projecting infrared light by transmitting at least a part of the infrared light through the screen, or a method for projecting infrared light by letting at least a part of the infrared light pass through a pass-through part disposed in the screen.

Here, remarkably high prevention effect is expected for the first example or the third example since there is no factor of drastically reducing an amount of light in cases where the infrared light is directly incident into the imaging means.

Further, the first example include such a case in which the infrared light is reflected by an object other than the screen. The object may have a high reflection ratio for the infrared light and may be, for example, a wall or an infrared light reflection mirror so called a hot mirror. Alternatively, the object that reflects the infrared light may be one that scatters the infrared light. In the following, the object is the same as ones reflecting the infrared light.

As the pass-through part in the third example, a construction such as a cut or gap extending to one direction (e.g. slit), a hole part through the screen (e.g. small hole or bore), or any other construction in which the infrared light may pass through the screen from the rear side to the front side may be contemplated. Here, it is preferred to have one or more pass-through parts in the screen. In general, stronger infrared light is output toward the front side of the screen as more number of the pass-through parts are provided. Further, the pass-through parts may be distributed uniformly on a whole screen area or concentrated in a particular area (e.g. screen center part or screen peripheral part).

On the other hand, significant prevention effect is expected for case, like the second example, where the infrared light passed through the screen may be incident into the imaging means for some screen construction types. Particularly, sufficient prevention effect is expected for a type in which an original visual image is projected from behind the screen since it is expected high transmission ratio of the infrared light is also high.

For the second example, followings may be used. The means include a screen having an area of transmitting the infrared light with a thinner member part compared to the other part of the screen (for example, a concaved part) thereby enabling easily transmission of the infrared light, a method for varying a member which easily transmits the infrared light and letting the infrared light pass the member, or a screen comprising members that easily pass the infrared light.

In any of the above-described examples, a projection direction of visual image onto the screen may be either a direction from the viewer/audience side to the screen or a direction from the rear side of the screen viewing from the viewer/audience to the screen side (viewer/audience direction). The same applies to the following other methods.

(2) As one of methods for interfering unauthorized imaging of visual image projected on a screen, the following technique is provided. In the technique, infrared light is projected to a viewer/audience direction from one or more infrared light projector means disposed at a front side of the screen viewing from the viewer/audience side whereby enabling the infrared light to be incident into imaging means of a person conducting the unauthorized act.

The method will eliminate needs of reflecting infrared light projected onto a screen surface of poor reflection ratio. Accordingly, the projected infrared light may be effectively incident into the imaging means of a person conducting the unauthorized act. Further, more ample amount of the infrared light may be incident into the imaging means compared to that of the previous method since there is almost no interfering object exist in between the infrared light projector means and the imaging means as well as the infrared light may be projected from close vicinity of a person conducting the unauthorized act.

A projection direction of the infrared light projector means may be fixed or varied automatically. The projection direction, that may be variably set, may include a particular direction (not only single direction but also a plurality of directions) or any arbitrary direction. By varying the projection direction, it becomes possible to eliminate space that could allow the unauthorized imaging act. The same applies to the other methods.

Further, when the infrared light projector means and the infrared light reflection means are used in combination, the infrared light may be projected to a wider area similar to the previous case described above in case that at least one of means is capable of varying the projection direction or the reflection direction. Further, this method does not exclude use of an object having a high infrared light reflection ratio, such as a wall or infrared light reflection mirror.

(3) As a method for interfering unauthorized imaging of visual image projected on a screen, the following is provided. In the method, infrared light is directly projected to a viewer/audience direction from one or more infrared light projector means disposed in a vicinity of the screen whereby enabling the infrared light to be incident into imaging means of a person conducting the unauthorized act.

The method also will eliminate needs of reflecting infrared light projected onto a screen surface of poor reflection ratio. Accordingly, the projected infrared light may be effectively incident into the imaging means of a person conducting the unauthorized act. Further, in this method, more ample amount of the infrared light may be incident into the imaging means compared to the method of (1) since there is almost no interfering object exist in between the infrared light projector means and the imaging means as well as the infrared light may be projected from close vicinity of a person conducting the unauthorized act.

Here, in the vicinity of the screen, not only space along outer periphery of the screen but also space extending outward from the outer periphery are included. Further, space in the vicinity of the screen is not necessary to be the same plane of the screen in strict sense. It is supposed that the vicinity of the screen may be positioned at a front side or back of a hypothetical plane including the screen with having a certain amount of distance in between.

(4) As a method for interfering unauthorized imaging of visual image projected on a screen, the following is provided. In the method, infrared light, that is projected from at least one or more infrared light projector means, is reflected to a viewer/audience direction whereby enabling the infrared light to be incident into imaging means of a person conducting the unauthorized act.

The method does not use a screen surface of poor reflection ratio as the reflection means. Instead, it uses the infrared light reflection means with the high reflection ratio whereby enabling more ample amount of the infrared light to be incident into the imaging means of a person conducting the unauthorized act. Accordingly, it becomes possible to realize lowering of output of the infrared light projector means.

Here, the infrared light reflection means may be disposed in any arbitrary position. For example, it may be disposed in a front side of the screen viewing from the viewer/audience side, or in a rear side of the screen, or in the vicinity of the screen. In any case, it is desired that the position may be one from which ample amount of the infrared light incident into the imaging means of a person conducting the unauthorized act.

Further, the infrared light reflection means or its reflection surface may be configured as that its reflection direction is varied arbitrary by actuator means. By utilizing such infrared light reflection means, an area, in which the infrared light prevention is possible, may be expanded compared to that of the fixed reflection direction.

Further, the infrared light reflection means may be, for example, an infrared light reflection mirror. Such member may be in a film form or any other predetermined forms with arbitrary thickness.

(5) As a method for interfering unauthorized imaging of visual image projected on a screen, the following is provided. In the method, an infrared light is intermittently emitted from at least one or more infrared light projector means whereby enabling predetermined intermittent emission pattern to be recorded on imaging means of a person conducting the unauthorized act.

The method enables to record the intermittent emission pattern irrelevant to the present feature of program on visual images recorded in the unauthorized manner by intermittently emitting the infrared light. Recorded pattern of the intermittent light differs depending on in what form the infrared light incident into the imaging means.

For example, in case in which scattered light of the infrared light which light flux is uniformly spread out is incident, an emission intensity of infrared light may be frequently changed whereby enabling to degrade quality of visual images so much as that viewing becomes difficult. Further, for another example, in case in which spread of light flux is limited to a certain size (including pin point size), an intensity of infrared light may be frequently changed at a part of the screen. This case similarly enables to degrade quality of visual images so much as that viewing becomes difficult.

Further, it is obvious that this emission control method may be combined with the above described methods (1)–(4). That is, the infrared light projector means may be disposed at any arbitrary location. It is also possible to combine this method with the method in which the infrared light reflection means actively reflect. Alternatively, following methods may be possible for controlling the infrared light emission.

(5a) Method for controlling at least one or more infrared light projector means based on predetermined code information to emit intermittently so as to record information along time axis direction:

This method superimposes information on the emission timing itself. That is, prescribe information (for example, output date/time, output location, screen number (number uniquely identifiable of each screen), output apparatus, a person performing output, and any other information required to identify a location where the unauthorized act is conducted) is forced to be recorded as point image pattern in binary form. Of course, it is also possible to prevent the viewing by the intermittent emission itself.

When a plurality of the infrared light projector means are used, all of them may be turned on/off at the same time, or emitting position may be changed in sequence in relay form like (5b) while the emission timing itself may be controlled as the same way as a case in which only single infrared light projector means is used. Further, the emitting position may be randomly changed or changed in sequence in accordance with a predetermined rule when the plurality of the infrared light projector means are used.

(5b) Method for controlling plural infrared light projector means based on predetermined code information to emit intermittently in relay form so as to record information along time axis direction:

Although this method may be applicable to a case in which the emission timing itself compose meaning like in the case of (5a) (no meaning in a position of the light image), the method enables to superimpose desired information in light image positions themselves to be recorded. For example, a following method may be applicable. In the method, the light image position may be changed in accordance with a series of binary data representing the desired information when two light image positions are provided wherein "1" of the binary data is assigned to one of the positions and "0" of the binary data is assigned to the other. Of course, it is also possible to prevent the viewing by the intermittent emission itself. Further, the desired information may be forced to be recorded without affecting the viewing of the viewer/audience (only an effect comparable to natural noise will be recognized by many of the viewer/audiences) when area size of the recorded light image is small.

(5c) Method for controlling plural infrared light projector means based on predetermined code information to emit intermittently in relay form so as to record two-dimensional information:

In this method, positions at which the light images appeared are compressed along the time axis direction to compose single plane so as to reveal the recording of a two dimensional information (figure, code or any other recognizable shape). For example, the method may define correspondences between the light image position itself and the information by dividing the screen into four sections and by assigning one theater a pattern in which the light image appears on all of the four sections and another theater another pattern in which the light image appears on three sections except the upper right section. Further, it is also possible to vary two dimensional information on a transition trajectory of the light image positions. For example, it is possible to configure so as that a two dimensional information may be appeared when the light image is traced as it appeared. Alternatively, it is also possible to superimpose the information in the light image transition direction itself.

(5d) Method for controlling plural infrared light projector means to emit in predetermined combination so as to record two-dimensional information:

The method enables to instantly identify the light images dispersed in the time axis direction as in (5c) on the same screen. For example, it is possible to associate the plural light images with a bar code pattern. Alternatively, more information may be recorded by associating patterns (graphical pattern) representative of the light images with multi-valued code information and changing the displaying pattern along the time axis direction. This method is a composite method for combining information along the time axis and information in two dimensional direction.

(5e) Method for disposing at least one or more infrared light projector means comprising an array of light emitting devices at a rear side of the screen viewing from a viewer/audience side, and controlling individual light emitting device to generate an emission pattern of the infrared light whereby enabling a predetermined information to be recorded in imaging means of a person conducting the unauthorized act:

This method is similar to embodiment (5d) except the infrared light projector means comprises plural light emitting devices and the disposing location of the infrared light projector means is at behind the screen. Information may be displayed on the same screen in a instantly recognizable form even by controlling the emission by each light emitting device. Of course, more information may be recorded by associating patterns (graphical pattern) representative of the light images with multi-valued code information and changing the displaying pattern along the time axis direction. Alternatively, the method may be configured so as that predetermined information is displayed by utilizing only the emission of plural light emitting devices arrayed in the same infrared light projector means or the predetermined information is displayed by utilizing the emissions of combined light emitting devices, each set of the devices being arrayed in different infrared light projector means.

(6) As a method for interfering unauthorized imaging of visual image projected on a screen, the following is provided. In the method, brightness at a screen surface is detected by at least one or more light sensors facing the screen surface and being disposed behind the screen viewing from viewer/audience side, and an amount of infrared light projected from an infrared light projector means is increased as the detected brightness of the screen surface decrease.

This method is a method for increasing the amount of the infrared light projected onto a scene or area of the screen surface having the low brightness. By using this method, the amount of the infrared light is lowered when the brightness of the screen surface is high (screen is bright) and thus prevention effect of the infrared light is small, and the amount of the infrared light is increased when the brightness of the screen surface is low (screen is dark) and thus prevention effect of the infrared light is large. Accordingly, the prevention effect is higher compared to a case in which the same amount of the infrared light is constantly emitted or the infrared light is projected uniformly over a whole screen surface.

The infrared light projector means may be disposed in an arbitrary position. Further, as regarding which path the infrared light should follow to enter the imaging means of a person conducting the unauthorized act, the path requiring reflection on the screen, the path for direct incident through space other than the screen, or the path passing through or transmitting through the screen is possible. Of course, it is possible to combine this method with the above described methods (1)–(5).

(6a) Method for detecting brightness at a screen surface with at least one or more light sensors that are disposed behind the screen viewing from viewer/audience side and facing the screen surface, and projecting infrared light from at least one or more infrared light projector means when the detected brightness of the screen surface is equal or less than a predetermined brightness whereby enabling the infrared light to be incident into an imaging means of a person conducting an unauthorized act:

This method enables to increase the relative brightness level of the infrared light with respect to the visual image of the main feature program, and to effectively amplify the effect of the infrared light since the infrared light is projected onto the screen surface during the dark scene or the dark period. Accordingly, the ample effect may be generated with the infrared light projector means with a low output power. Also in this case, the infrared light projector means may be disposed any arbitrary position. It is possible to contemplate that a route of the infrared light to be incident into the imaging means of a person conducting the unauthorized act may be one requiring reflection at the screen, one passing through space other than the screen to direct incident, one passing or transmitting through the screen, or the like. Of course, it is possible to combine this method with the above-cited methods (1)–(5).

Further, it is possible to select the vicinity of screen center as a portion in which brightness of the screen is to be determined. A light image of the infrared light may be visualized more clearly by emitting the infrared light when the brightness at the vicinity of screen center is low. Accuracy of determination of whether the visual image is dark or bright may increase in case that a plurality of the detection results are used and the infrared light is projected when a predetermined number of the detection results, in which brightness of the screen surface is detected to be equal or less than a predetermined brightness, are detected, so as to promote reliability. Alternatively, an average value of the plural detection results may be set as the brightness of the screen surface and compared with a threshold value.

Here, "the predetermined brightness", that is the threshold value for determining the screen brightness, may be fixed independent of the visual images projected on the screen or varied to be a different value depending on the visual image. Alternatively, the predetermined brightness may be independently adjusted by a manager side in a commercial system such as a movie theater. In this case, a function disabling an adjustment to a value equal or less than a predetermined brightness may be employed as a safety measure whereby enabling to countermeasure an ill-intentioned manager. Alternatively, the predetermined brightness may be controlled in accordance with an instruction from a content-provider side connected via a network. Of course, such instruction may also be notified off-line.

Further, "the predetermined number", that is the threshold value for determining whether the infrared light should be projected or not, may include a number "one". In general, the accuracy of determination increases as the threshold value for determination increases. The predetermined number may also be independently adjusted by a manager side in a commercial system such as a movie theater. In this case, the infrared light is constantly emitted when no detection result is inputted (case of NO SIGNAL) as well as a function disabling an adjustment to a value more than the number of detection results to be used for the determination may be employed as a safety measure whereby enabling to countermeasure an ill-intentioned manager. Furthermore, the predetermined value may also be controlled in accordance with an instruction from a content-provider side connected via a network. Of course, such instruction may also be notified off-line.

Here, the emission of the infrared light may be an emission that generates a light image to-be-recorded extending to a whole area of the screen or a light image extending only to a portion or multiple portions of the screen. The following methods may be contemplated as a method for controlling the emission of the infrared light.

(6b) Method for detecting brightness at a screen surface with at least one or more light sensors facing the screen, and individually projecting infrared light from at least one or more infrared light projector means in case that the brightness of the screen surface is equal or less than a predetermined brightness whereby enabling the infrared light to be incident into imaging means of a person conducting an unauthorized act, wherein the at least one or more light sensors are disposed behind the screen viewing from a viewer/audience side, and the infrared light projector means projecting the infrared light is associated with an area corresponding to the light sensor detecting the brightness equal or less than the predetermined brightness:

This method enables to adaptively project the infrared light onto partial area(s) of the screen surface, in which the brightness is low, whereby enabling the recording of light images of the infrared light at corresponding partial area(s). With utilizing the method, it would be difficult to view the visual images recorded in the unauthorized way since the infrared light is recorded onto the partial area with the low brightness. Of course, it is possible to combine this method with the above-cited methods (1)–(5).

(6c) Method for reproducing time information, in which brightness at a screen becomes equal or less than a predetermined brightness value, from a recording medium, and projecting infrared light from at least one or more infrared light projector means in accordance with the reproduced information whereby enabling the infrared light to be incident into an imaging means of a person conducting an unauthorized act:

This method is not to control the infrared light emission in real-time based on the detection results of actual measurements, but a method for controlling the infrared light emission based on the information provided from a distributor of the main feature program or a provider or the like. That is, the method obtains the information of method (6) from the recording medium and requires no light sensor or the like.

The recording medium to be read may be ones recording information required for the emission control of the infrared light distributed from the distributor or the provider to the projector side as well as ones used for recording information received by the projector side via a network. Of course, it is possible to combine this method with the above-cited methods (1)–(5).

(6d) Method for reproducing area and time information, in which brightness at a screen becomes equal or less than a predetermined brightness value, from a recoding medium, and individually projecting infrared light from at least one or more infrared light projector means associated with corresponding areas on the screen in accordance with the reproduced information whereby enabling the infrared light to be incident into an imaging means of a person conducting an unauthorized act:

This method does not control the infrared light emission based on the real-time detection results. Instead, the method is a method for controlling the infrared light emission based on the information provided from the distributor of the main feature program or the provider or the like. With employing such method, it is also possible to attain an object of enabling the record of the infrared light image at the partial areas by adaptively projecting the infrared light to the screen surface at the partial areas having the low brightness. Of course, it is possible to combine this method with the above-cited methods (1)–(5).

(6e) Method for receiving information from a network for time in which brightness at a screen becomes equal or less than a predetermined brightness value in synchronization with a projection of visual images, and individually projecting infrared light from at least one or more infrared light projector means in accordance with the received information whereby enabling the infrared light to be incident into an imaging means of a person conducting an unauthorized act:

This method is a method for acquiring information relating to method (6) via the network and controlling the infrared light emission. With employing such method, it is also possible to attain an object of enabling the record of the infrared light image at the time periods by adaptively projecting the infrared light to the screen surface at the time periods having the low brightness. The information may be received in synchronization with the output of visual images when the projection of the main feature program to the screen is performed only once. When the output of the main feature program is repeated plural times, the predetermined information (information indicating time periods in which brightness of the screen becomes equal to or less than the predetermined brightness value) may be received every time the output is performed. Alternatively, it is also possible to acquire the predetermined information in real-time for the first time and use the information recorded when it was received for the first time for the subsequent outputs. Of course, it is also possible to combine this method with the above-cited methods (1)–(5).

(6f) Method for receiving information from a network for area and time in which brightness at a screen becomes equal or less than a predetermined brightness value in synchronization with a projection of visual images, and individually projecting infrared light from at least one or more infrared light projector means associated with corresponding areas on a screen in accordance with the received information whereby enabling the infrared light to be incident into an imaging means of a person conducting an unauthorized act:

This method is a method for acquiring information relating to method (6c) via the network and controlling the infrared light emission. With employing such method, it is also possible to attain an object of enabling the record of the infrared light image at the partial areas by adaptively projecting the infrared light to the screen surface at the partial areas having the low brightness. The information may be received in synchronization with the output of visual images when the output of the main feature program to the screen is performed only once. When the output of the main feature program is repeated plural times, the predetermined information (information indicating area and time in which brightness of the screen becomes equal to or less than the predetermined brightness value) may be received every time the output is performed. Alternatively, it is also possible to acquire the predetermined information in real-time for the first time and use the information recorded when it is received in the first time for the subsequent outputs. Of course, it is also possible to combine this method with the above-cited methods (1)–(5).

(6g) Method for projecting infrared light from at least one or more infrared light projector means during a period of shielding the projection light with a frame transferring shutter when the visual image is projected from a film type projector means whereby enabling the infrared light to be incident into an imaging means of a person conducting an unauthorized act:

This method is a unique one for a case when the film type projection is utilized. Namely, the present embodiment is focused on features of closing the frame transferring shutter so as to shield the projection light when the film frame is transferred. The present embodiment ensures the recording of the infrared light image by projecting the infrared light during a period when the frame transferring shutter has been closed for considering a decrease of the screen surface brightness. With utilizing such method, it is possible to accomplish an object of recording the infrared light image. The period of shielding the projection light with the frame transferring shutter may be detected or predicted from a frame transferring motion, or may be detected or predicted from a motion of the frame transferring shutter. Of course, it is also possible to combine this method with the above-cited methods (1)–(5).

(7) As a imaging prevention method for interfering unauthorized imaging of visual image projected on a screen, the following is provided. The method is for projecting infrared light from at least one or more infrared light projector means disposed in a vicinity of the screen whereby enabling the infrared light reflected on the screen to incident into an imaging means of a person conducting the unauthorized act.

This method shares the same principle as an conventional system on features wherein the infrared light is projected toward the screen from the vicinity of the screen front whereby enabling the reflected infrared light at the screen to incident into the imaging means of a person conducting the unauthorized act. However, in this method, the disposing location of the infrared light projector means is optimized and set to the vicinity of the screen so as to increase an amount of the infrared light reflected at the screen surface remarkably with respect to the conventional system.

With employing this configuration, the technical effect substantially the same as that of the conventional system may be obtained by using the infrared light projector means with less output. If the infrared light projector means with substantially the same output as that of the conventional system is utilized, far greater prevention effect may be obtained. In general, a greater prevention effect may be obtained by using a less output infrared light projector means.

(8) As an imaging prevention method for interfering unauthorized imaging of visual image projected on a screen, the following is provided. The method is for automatically adjusting a projection direction of at least one or more infrared light projector means disposed in a vicinity of the screen in correspondence with size change of the screen, and projecting infrared light to the adjusted projection direction whereby enabling the infrared light reflected on the screen to incident into an imaging means of a person conducting the unauthorized act.

This method enables to secure the projection direction optimized in accordance with the screen size by automatically adjusting the infrared light projection direction (projection position of the infrared light projected on the screen) coupled with the screen size change. Particularly, it is more important for the infrared light projector means projecting to a corner portion of the screen since there is a possibility of that the infrared light may not be contributed in the prevention of the unauthorized act when the screen size is changed. The adjustment may be performed manually. According to the present embodiment, an operational efficiency may be improved since an operator only has to consider the screen size change. The infrared light projector means is not limited to ones disposed in the vicinity of the screen.

(9) As a system for interfering unauthorized imaging of visual images projected onto a screen, the following is provided. In the system, at least one or more infrared light projector means are disposed at a rear side of the screen viewing from viewer/audiences and infrared light is projected from the at least one or more infrared light projector means to a viewer/audience direction whereby enabling the infrared light to enter an imaging means of a person conducting the unauthorized act.

This system corresponds to the above-cited method (1). That is, the system enables to project infrared light from the rear side of the screen and enables the infrared light to efficiently enter the imaging means of a person conducting the unauthorized act without requiring the reflection at the screen surface. The description of (1) also applies to this system.

(10) As a system for interfering unauthorized imaging of visual images projected onto a screen, the following is provided. In the system, at least one or more infrared light projector means are disposed at a front side of the screen viewing from viewer/audiences and infrared light is projected from the at least one or more infrared light projector means to a viewer/audience direction whereby enabling the infrared light to directly enter an imaging means of a person conducting the unauthorized act.

This system corresponds to the above-cited method (2). That is, the system enables to project infrared light from the front side of the screen and enables the infrared light to efficiently enter the imaging means of a person conducting the unauthorized act without requiring the reflection at the screen surface. The description of (2) also applies to this system.

(11) As a system for interfering unauthorized imaging of visual images projected onto a screen, the following is provided. In the system, at least one or more infrared light projector means are disposed in a vicinity of the screen and infrared light is projected from the at least one or more infrared light projector means to a viewer/audience direction whereby enabling the infrared light to enter an imaging means of a person conducting the unauthorized act.

This system corresponds to the above-cited method (3). That is, the system enables to project infrared light from in the vicinity of the screen and enables the infrared light to enter the imaging means of a person conducting the unauthorized act without requiring the reflection at the screen surface. The description of (3) also applies to this system.

(12) As a system for interfering unauthorized imaging of visual images projected onto a screen, the following is provided. The system comprises at least one or more infrared light projector means for projecting infrared light, and infrared light reflection means for reflecting infrared light projected from the at least one or more infrared light projector means so as the infrared light directly incident into an imaging means of a person conducting the unauthorized act.

This system corresponds to the above-cited method (4). That is, the system enables to increase an amount of the infrared light entering to the imaging means of a person conducting the unauthorized act by utilizing the infrared light reflection means actively reflecting the infrared light. The description of (4) also applies to this system.

A driving technique of driving means for variably controlling the infrared light reflection means or its reflection surface may not be limited to particular ones. Further, it is not necessary to control the reflection surface of the infrared light reflection means so as that a whole area of the reflection surface is directed to the same direction. Alternatively, when the reflection surface is divided into a plural of sections and each of the sections is independently controllable, each of the sections may be controlled to direct a different direction.

(13) As a system for interfering unauthorized imaging of visual images projected onto a screen, the following is provided. The system comprises at least one or more infrared light projector means for projecting infrared light, and emission control means for controlling the at least one or more infrared light projector means to emit intermittently so as an imaging means of a person conducting the unauthorized act records a predetermined pattern of the intermittent emission.

This system corresponds to the above-cited method (5). That is, the system enables to force recording of the emission pattern irrelevant to the main feature of the program illegally recorded by intermittently emitting the infrared light. The description of (5) also applies to this system.

The emission control means may be, for example, an electronic circuit such as a computer, an IC for specific purpose, switching means for switch-controlling the emission according to a clock or its divided frequency output, switching means for switch-controlling the emission according to charging/discharging of a capacitor or the like, or, switching means for switch-controlling the emission by a mechanical structure or the like. Of course these function may be realized with using software or hardware. This system may include systems corresponding to methods (5a)–(5e).

(13a) System utilizing emission control means for enabling at least one or more infrared light projector means to emit intermittently in accordance with a predetermined code information so as that an imaging means of a person conducting the unauthorized act records information along a time axis, instead of using the emission control means of (13):

This system corresponds to the above-cited method (5a). That is, in this system, the information is superposed on the emission timing itself. The description of (5a) also applies to this system.

(13b) System utilizing emission control means for controlling a plurality of infrared light projector means to emit intermittently in relay format in accordance with a predetermined code information so as that an imaging means of a person conducting the unauthorized act records information along a time axis, instead of using the emission control means of (13):

This system corresponds to the above-cited method (5b). That is, in this system, the emission timing itself may have meanings in some case, and it is also possible to superpose the desired information on locations of the recorded light images themselves. The description of (5b) also applies to this system.

(13c) System utilizing emission control means for controlling a plurality of infrared light projector means to emit intermittently in relay format in accordance with a predetermined code information so as that an imaging means of a person conducting an unauthorized act records a two-dimensional information, instead of using the emission control means of (13):

This system corresponds to the above-cited method (5c). That is, the system enables to clearly ascertain the record of the two-dimensional information (figure, notation, or any other identifiable forms) when light image positions are compressed in the time-axis direction. The description of (5c) also applies to the system.

(13d) System utilizing emission control means for controlling a plurality of infrared light projector means to emit intermittently in a predetermined combination so as that an imaging means of a person conducting the unauthorized act records a two-dimensional information, instead of using the emission control means of (13):

This system corresponds to the above-cited method (5d). That is, the system enables to ascertain the record of light images in all locations, that are spread in the time axis direction in the above-cited (13c), at the same display screen simultaneously by lighting them up altogether. The description of (5d) also applies to this system.

(13e) System utilizing at least one or more infrared light projection unit comprising a plurality of light emitting devices disposed in an array for projecting infrared light, and an infrared light projection control unit for individually controlling said light emitting device of the infrared light projector means disposed in a rear side of the screen viewing from a viewer/audience side so as that an imaging means of a person conducting an unauthorized act record a predetermined information corresponding to an emission pattern of the infrared light:

This system corresponds to the above-cited method (5e). That is, this system is similar to embodiment (13d). Of course, the description of (5d) also applies to the system. Further, the infrared light projection control unit may be, for example, an electronic circuit such as a computer, an IC for specific purpose, switching means for switch-controlling the emission according to a clock or its divided frequency output, switching means for switch-controlling the emission according to charging/discharging of a capacitor or the like, or, switching means for switch-controlling the emission by a mechanical structure or the like.

(14) As an imaging prevention system for interfering unauthorized imaging of visual image projected on a screen, the following is provided. The system comprises at least one or more infrared light projector means for projecting infrared light, and at least one or more light sensors disposed in a rear side of the screen viewing from a viewer/audience side for detecting brightness of the facing screen, wherein a detection result of the light sensor is outputted to the corresponding infrared light projector means as a light amount adjusting signal for increasing an amount of the infrared light as the detected brightness of the screen surface decrease.

This system corresponds to the above-cited method (6). That is, this system enables to adaptively increase the amount of the infrared light projected onto a scene or area of the screen surface having the low brightness whereby enabling the infrared light to be easily recorded on an imaging means of a person conducting an unauthorized act. The description of (6) also applies to this system.

For example, a photo-diode or a photo-transistor may be employed for the light sensor. Further, this system may include systems corresponding to methods (6a)–(6g).

(14a) As an imaging prevention system for interfering unauthorized imaging of visual image projected on a screen, the following system is provided. The system comprises at least one or more infrared light projector means for projecting infrared light, at least one or more light sensors disposed close to a backside of the screen viewing from a viewer/audience side, and an infrared light projection control unit for accepting output signals from the light sensors and for controlling the at least one or more infrared light projector means to project the infrared light in case that a brightness of the screen surface facing the light sensor is equal or less than a predetermined brightness.

This system corresponds to the above-cited method (6a). That is, this system enables to project the infrared light onto a scene or area of the screen surface having the low brightness based on the detection results of the screen surface brightness whereby enabling the infrared light to be easily recorded on an imaging means of a person conducting an unauthorized act. The description of (6a) also applies to this system.

For example, electronic circuits such as a computer or an IC for specific purpose may be employed as the infrared light projection control unit. More specifically, it requires memory means for recording a predetermined value, comparison means for comparing the predetermined value and the detection value, means for specifically controlling the emission of the infrared light projector means based on the comparison result.

In case that a plural of the comparison results are considered, corresponding functional means is required. For example, it further requires means for counting the number of light sensors in which the brightness equal or less than the predetermined number is detected, memory means for recording a predetermined number that becomes a comparison reference number, comparison means for comparing these predetermined numbers and actual measurement values (counting values) and so on when the infrared light projector means emit only in case that the number of areas in which the brightness is less than the predetermined value is equal or bigger than a predetermined number in single scene or a region to be detected.

Further, in case that, for example, emissions of the infrared light projector means are switched in accordance with a distribution pattern of the areas in which the brightness is less than the predetermined value over the screen, it further requires memory means for recording distribution patterns to be considered, determination means for determining which of the distribution patterns is matched to the measured pattern by comparing with the stored distribution patterns, means for specifying the infrared light projector means to be emission-controlled based on the determined distribution pattern, and so on. Of course, these functions may be realized by means of software or hardware.

(14b) System utilizing an infrared light projection control unit for individually controlling at least one or more infrared light projector means to project infrared light from the infrared light projector means associated with an area corresponding to the light sensor from which the detection result is obtained in case that a brightness of the screen surface is equal or less than a predetermined brightness, instead of using the infrared light projection control unit of (14a):

This system corresponds to the above-cited method (6b). That is, this system enables to adaptively project the infrared light onto partial areas of the screen surface having the low brightness whereby enabling the infrared light image to be easily recorded not for whole area of the screen but for partial areas. The description of (6b) also applies to this system.

(14c) System utilizing reproducing means for reproducing time information in which brightness at the screen becomes equal or less than a predetermined brightness value from a recording medium, and an infrared light projection control unit for controlling projection of infrared light from the at least one or more infrared light projector means in accordance with the reproduced information, instead of using the light sensor and the infrared light projection control unit of (14a):

This system corresponds to the above-cited method (6c). That is, this system assumes a case in which the time periods of low brightness are stored as information in the recording medium and not determined by the measurement results. The system does not require the light sensor. The description of (6c) also applies to this system.

(14d) System utilizing reproducing means for reproducing area and time information in which brightness at the screen becomes equal or less than a predetermined brightness value from a recording medium, and an infrared light projection control unit for individually controlling projection of infrared light from the at least one or more infrared light projector means associated with corresponding areas of the screen in accordance with the reproduced information, instead of using the light sensor and the infrared light projection control unit of (14a):

This system corresponds to the above-cited method (6d). That is, this system assumes a case in which the partial areas and the time periods of low brightness are stored as information in the recording medium and not determined by the measurement results. The system does not require the light sensor. The description of (6d) also applies to this system.

(14e) System utilizing receiving means for receiving information from a network for time in which brightness at the screen becomes equal or less than a predetermined brightness value in synchronization with the projection of said visual image, and an infrared light projection control unit for controlling projection of infrared light from the at least one or more infrared light projector means in accordance with the received information, instead of using the light sensor and the infrared light projection control unit of (14a):

This system corresponds to the above-cited method (6e). That is, this system assumes a case in which the time periods of low brightness are received via the network and not determined by the measurement results. The system does not require the light sensor nor brightness detection means. The description of (6e) also applies to this system.

(14f) System utilizing receiving means for receiving information from a network for area and time in which brightness at the screen becomes equal or less than a predetermined brightness value in synchronization with the projection of visual image, and an infrared light projection control unit for individually controlling projection of infrared light from the at least one or more infrared light projector means associated with corresponding areas on the screen in accordance with the received information, instead of using the light sensor and the infrared light projection control unit of (14a):

This system corresponds to the above-cited method (6f). That is, this system assumes a case in which the partial areas and the time periods of low brightness are received via the network and not determined by the measurement results. The system does not require to dispose the light sensor. The description of (6f) also applies to this system.

(14g) System utilizing shielding period detection means for detecting a period of shielding the projection light with a frame transferring shutter, and an infrared light projection control unit for controlling emission of the infrared light projector means based on detection results of the shielding period detection means, instead of using the light sensor and the infrared light projection control unit of (14a):

This system corresponds to the above-cited method (6g). That is, this system ensures the recording of the infrared light image by projecting the infrared light with consideration of a decrease in the screen surface brightness during a period of the frame transferring shutter closing. The description of (6f) also applies to this system.

As the shielding period detection means, following methods may be contemplated. The method may be a method for mechanically detecting the film transfer, or a method for electronically detecting the film transfer using a change of electrostatic capacitance or the like, or a method for mechanically detecting a motion of the shutter mechanism, or a method for electronically detecting a motion of the shutter mechanism.

(15) As an imaging prevention system for interfering unauthorized imaging of visual image projected on a screen, the following is provided. The system is to dispose at least one or more infrared light projector means in a vicinity of the screen surface at a front side of the screen viewing from viewers/audiences so as the infrared light reflected on the screen incident into an imaging means of a person conducting the unauthorized act.

This system corresponds to the above-cited method (7). That is, this system enables an ample amount of the reflected infrared light incident into the imaging means of a person conducting the unauthorized act by projecting the infrared light to the screen from locations at the vicinity of the screen. The description of (7) also applies to this system.

(16) As an imaging prevention system for interfering unauthorized imaging of visual image projected on a screen, the following is provided. The system comprises at least one or more infrared light projector means disposed in a vicinity of the screen surface for projecting infrared light to the screen, projecting direction actuator means for driving the infrared light projector means to vary its projecting direction, memory means for recording projecting direction information of each infrared light projector means according to a screen size, and projecting direction control means for reading out the projecting direction information from the memory means when an instruction to change the screen size is detected, for providing the read-out information to said projecting direction actuator means, and for automatically adjusting a projecting direction of said infrared light projector means.

This system corresponds to the above-cited method (8). That is, this system enables to provide the optimum projecting direction according to the screen size (aspect ratio) by automatically adjusting the projecting direction of the infrared light in conjunction with the change of the screen size. The description of (7) also applies to this system.

The system is suitable for a projection system having a plural screen sizes each suited for the visual image projection and required to change the screen size when necessary. For example, in a commercial system such as a movie theater, the screen size (aspect ratio) may be Standard (1:1.33), Europe Vista (1:1.66), America Vista (1:1.85), Scope (1:2.35), and so on. These values are examples of some typical values, and not limited only to these values.

The projecting direction information stored in the memory means may be, for example, a horizontal angle, an elevation angle, or the other information. Of course, an amount of motion or the other control values may be used instead of the angle. The projecting direction actuator means may comprise, for example, means for turning around an axis to which the infrared light projection means is attached, means for rotating or horizontally transporting a base on which the infrared light projection means is fixed, or the other means. As the projecting direction control means, a computer, an IC for specific purpose or the other electronic circuits may be used, for example.

(B) Specific Embodiment

In the following, the specific embodiments of imaging prevention method and system in accordance with the present invention will now be described.

(1) First Embodiment Example

The first embodiment example is shown in FIG. 1. This embodiment example is related to a novel feature of projecting infrared light to a viewer/audience direction from a rear side of the screen. FIG. 1 shows an example applicable for a movie-theater or other theater systems. Of course, the technique itself may be applicable to a home theater. In any cases, the visual images projected onto the screen include television programs and the other copyrighted products as well as a movie. Next, a specific example of each apparatus composing the system shown in FIG. 1 will now be described.

A projector apparatus 1 is a projection apparatus projecting visual images to be viewed/listened onto a screen 2. The projector apparatus 1 may be, for example, a film projector for projecting a movie film, a slide projector for projecting a slide, an overhead projector (OHP), a liquid crystal projector for directly projecting a digital image, a digital micro-mirror device (DMD) projector, a CRT projector or the like.

Although, FIG. 1 shows a type in which the projector apparatus 1 is disposed at a rear side of audience seats 4 and the reflected light at the screen surface is viewed by viewers/audiences, a location of the projector apparatus 1 is not limited to this particular one. For example, it is possible to contemplate that the projector apparatus 1 may be disposed a front side of the audience seats 4 (namely, between the screen 2 and the audience seats 4), or at above of the audience seats 4, or at a side wall side. Of course, the projector apparatus 1 may be disposed in a rear side of the screen 2 in case that visual images are projected from the rear side of the screen and its transmission light is viewed by the viewers/audiences (so-called a rear projection type).

Figure 2:
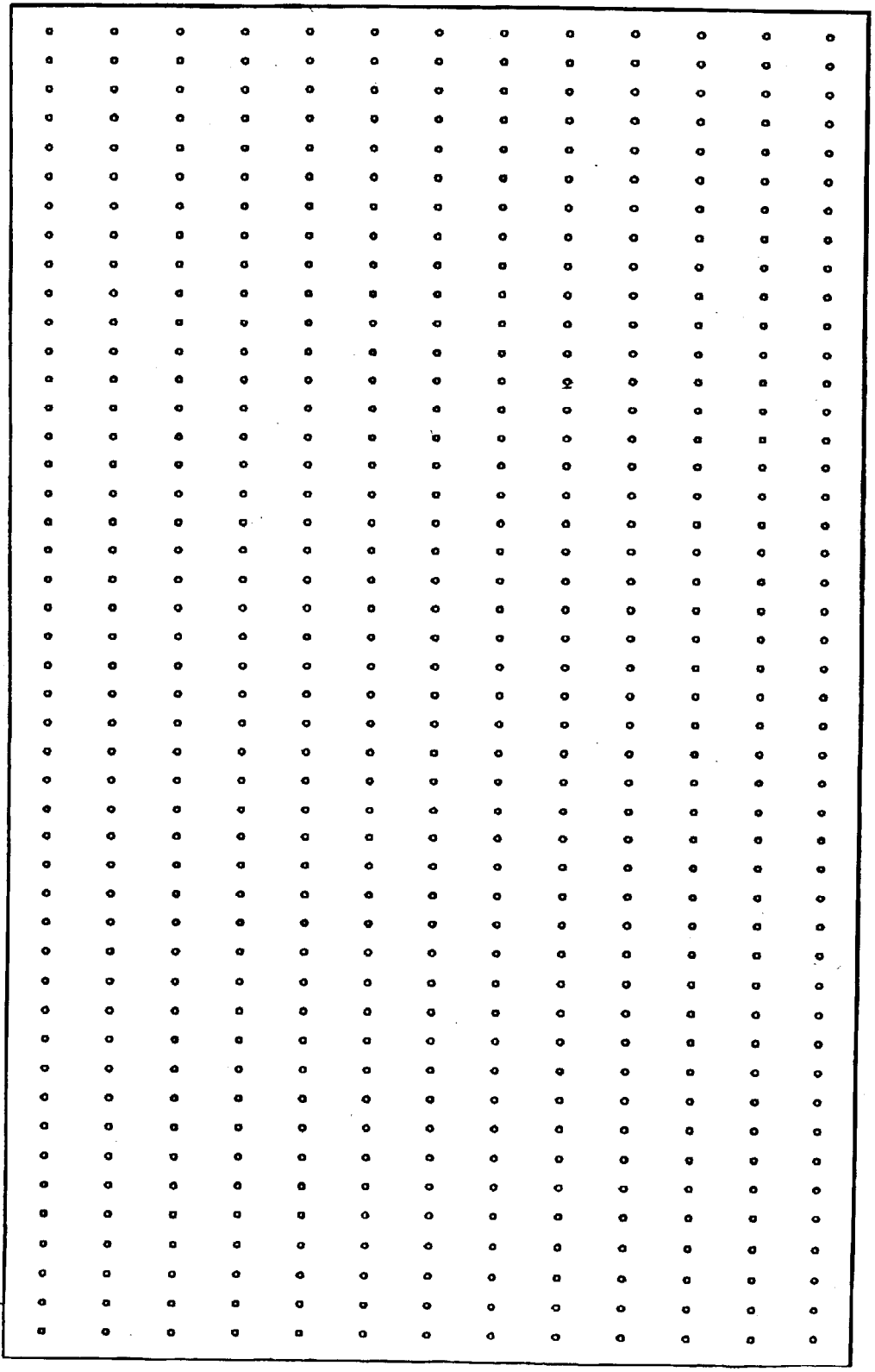
FIG. 2 is a schematic diagram illustrating a theater screen.

The screen 2 shown in FIG. 1 is a theater screen. In general, sound source holes (ventilation holes or any other structures connecting the rear side and the front side) called as a sound perforation are formed so as to effectively propagate sound from the sound source disposed at the rear side of the screen to the viewers/audiences side. An arbitrary shape or size or position may be selected for the: sound perforation. FIG. 2 shows an example of the sound perforation. In the present specification, the sound perforation is used to transmit infrared light from the rear side of the screen to the front side.

The screen 2 of FIG. 1 may be a screen without the sound perforation. In such case, it is preferred to have characteristics of having a screen comprising a material capable of transmitting the infrared light easily, or a screen with embedded members capable of transmitting the infrared light easily, or a screen having parts of thinner thickness than the rest of the screen.

An infrared light projector apparatus 3 is a projector apparatus projecting an infrared light to prevent unauthorized imaging of visual images projected onto the screen. It utilizes features of that the infrared light is not recognized by the viewers/audiences while sensed by CCD (solid state imaging device) of an imaging apparatus. It is possible to contemplate that the infrared light projector apparatus 3 may be, for example, a light emitting diode or any other devices emitting light flux mainly comprising of the infrared light, or a device of type in which an infrared light transmission filter is disposed at a light path and only the infrared light is finally outputted, or a device of type in which a visible light cut-filter and/or an ultra-violet cut-filter are disposed at a light path and only the infrared light is finally outputted.

It is considered that a typical location of the infrared light projector apparatus 3 is at a vicinity of the rear side of the screen. The position may be set an arbitrary location provided that the infrared light projector apparatus 3 is disposed at the rear side of a virtual reference plane including the screen surface viewing from the audience seats 4. For example, the infrared light projector apparatus 3 may be disposed at obliquely rear side of the screen (outside of the screen 2 frame) whereby a part or all of the infrared light may pass through space outside of the screen and be projected to the audience seats 4. The infrared light projector apparatus 3 may be embedded in the screen itself.

The infrared light projector apparatus 3 may be disposed in any arbitrary height provided that it is disposed at the rear space of the screen. The infrared light projector apparatus 3 may be positioned in a vicinity of the lower section of the screen 2 (height of the infrared light projector apparatus 3 may be higher or lower than the bottom hem of the screen 2) or in a vicinity of the middle section of the screen 2, or in a vicinity of the upper section of the screen 2 (height of the infrared light projector apparatus 3 may be higher or lower than the top hem of the screen 2). The optimum height of the infrared light projector apparatus 3 may vary depending on a relationship of the audience seats 4 and the screen 2. In general, the infrared light projector apparatus 3 may be disposed within an imaging area (or imaging angle) of the imaging apparatus used for the unauthorized imaging.

Figure 3:
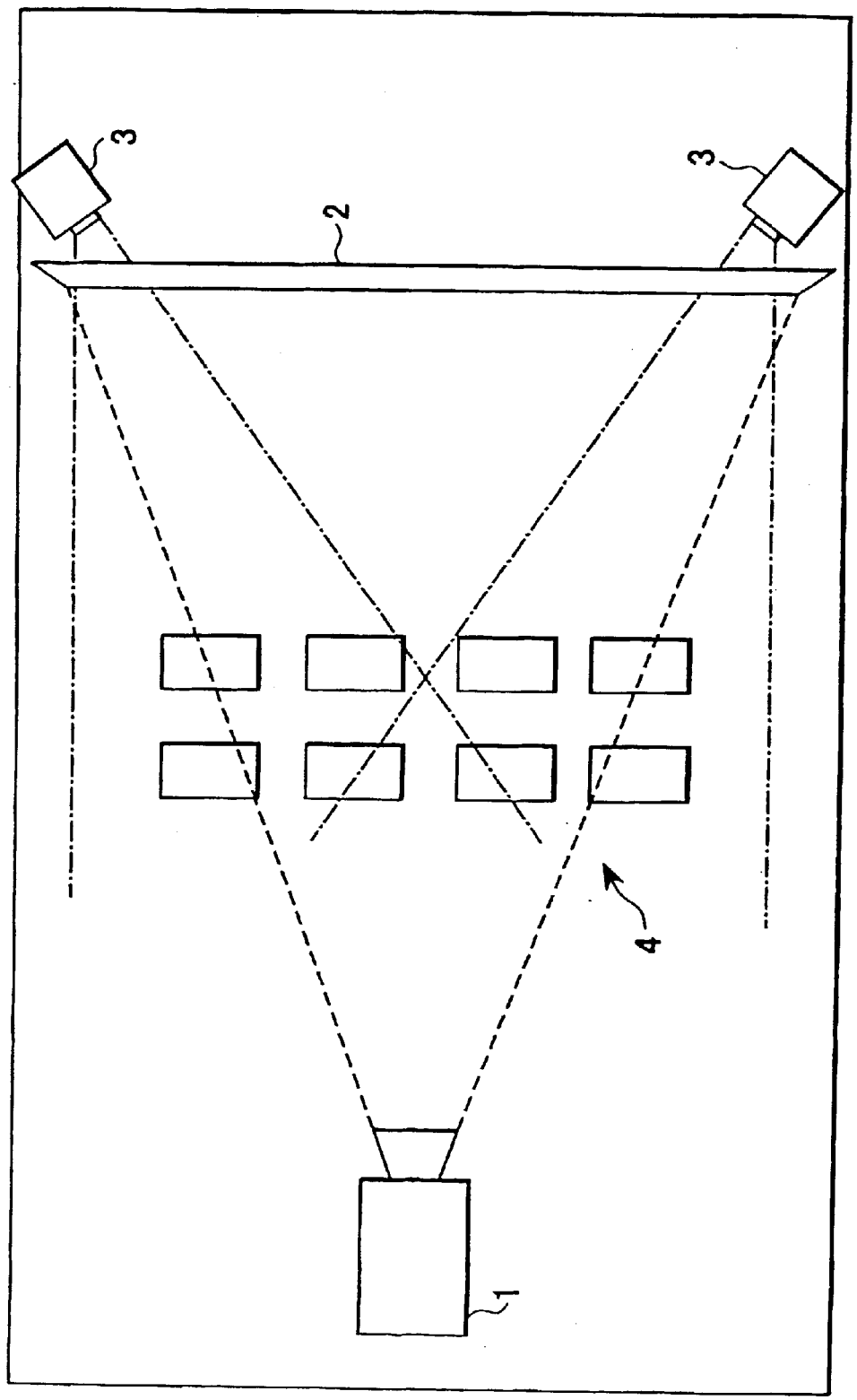
FIG. 3 is a schematic diagram illustrating one embodiment (part 2) wherein infrared light is projected to a viewer/audience direction from a rear side of a screen.

The projecting direction of the infrared light may be set arbitrary provided that the projected light flux is directed to an area or space at where the unauthorized imaging may take place. At least, the following directions may be selected. The directions is such that the projected light flux can cover a region with a certain height where the imaging without any interference is possible within the area in which the audience seats 4 are disposed. For example, in case that the infrared light projector apparatus 3 are disposed at vicinities of both right and left side edges of the screen 2 as shown in FIG. 3, the infrared light may be projected to obliquely front directions from their locations. Further, in case that the infrared light projector apparatus 3 is disposed at a vicinity of the top section of the screen 2, the projecting direction of the infrared light becomes an obliquely downward direction. In order to increase the prevention effect, it is preferable to arrange a light axis of the optical system in the imaging apparatus used for the unauthorized act and a light axis of the infrared light in such a way that both light axes become as parallel as possible.

Alternatively, in case that the light axis of the infrared light is changed by utilizing the infrared light reflection mirror (so-called hot mirror) or any other infrared light reflection unit, the light axis of the reflected infrared light may be needed to be directed to the above-mentioned region or space. Instead of reflecting the infrared light by the reflection mirror as mentioned in the above, the projection light axis of the reflected infrared light may be directed to the above-mentioned region or space by driving the infrared light projector apparatus 3 itself. For example, the infrared light projector apparatus 3 may be driven in a horizontal direction so as that the reflected light scans the audience side.

In any of the above-cited cases, it is preferable to determine disposition (location and height) of the infrared light projector apparatus or projecting direction so as to reduce an angle difference between the optical axis of the imaging apparatus and the light axis of the infrared light as much as possible. This is because the infrared light becomes easier to be recorded and the prevention effect becomes larger when the angle difference between the optical axis of the imaging apparatus and the light axis of the infrared light is smaller. The same things applies to the other embodiments.

Further, the infrared light may be a spread light having spread light flux, or a spot light having a tightened light flux. Alternatively, the infrared light may be projected to focus on the screen so as that a predetermined information (for example, output date/time, output location, screen number, output apparatus, output performer, or any other information required to identify a location in which the unauthorized act is performed) or character information (include marks and any other identifiable graphic information) may be recorded. Although it is a typical to use a constant emission (light on) for the infrared light providing these information, it is possible to provide a predetermined information by a technique of intermittently emitting the infrared light.

In addition to the above, the infrared light projection method may include a method for emitting the infrared light intermittently. By intermittently projecting the infrared light, the viewing becomes difficult since the brightness of the recorded screen varies independently with respect to visual images of the main feature of a program. It is also possible to enable reading out of desired information from appearance timings or appearance locations of the recorded light images by controlling the timing of the intermittent emission or the emission location of the infrared light projector apparatus 3. Any arbitrary intermittent emission methods described above may be utilized. Concrete emission methods will be described with the other embodiments in the following.

The number of the infrared light projector apparatus 3 is not limited to one. For example, FIG. 1 or FIG. 3 show cases where two of the infrared light projector apparatus 3 are used. Of course, three or more of the infrared light projector apparatus 3 may be disposed at discretion. FIG. 1 or FIG. 3 seems to show the infrared light projector apparatus 3 with single infrared light emission device. However, a plurality of the infrared light emission devices may also be mounted on the single infrared light projector apparatus 3. In this case, a simultaneous emission control of all the infrared light emission devices or an individual emission control may be performed at discretion.

The amount of the infrared light entering the imaging apparatus may be increased by projecting the infrared light to the audience seats from the rear side of the screen 2 as the present embodiment, more specifically by disposing the imaging apparatus for imaging visual images projected on the screen in the unauthorized manner and the infrared light projector apparatus 3 for projecting the infrared light to prevent such unauthorized imaging in a face-to-face position and by projecting the infrared light to directly incident into the imaging apparatus from the infrared light projector apparatus 3.

Consequently, the prevention effect greater than that of a conventional system may be expected. Further, the infrared light projector apparatus 3 having a emission brightness (output) less than the conventional system may be used when only the comparable prevention effect is required. Accordingly, an economical effect may be promoted in the apparatus or its system.

In case that the infrared light transmits through the screen, the prevention effect greater than a conventional system may be realized by utilizing a screen allowing easy transmission of the infrared light (for example, by utilizing a screen having material itself transmits easily, or a screen in which members having a high transmittance for the infrared light are partially embedded, or a screen in which concaved portions are partially formed for easy transmission of the infrared light). Particularly, in case that the screen capable of easy transmission of the infrared light is used, the present embodiment example has a far greater merit since ample amount of the reflected light may, not be anticipated for application of the conventional system. For example, in case that a rear projection type projector apparatus is included in the system, desired effect may not be obtained even when the conventional system is applied.

As described above, the system according to the present embodiment can achieve the prevention effect greater than the conventional system regardless of the infrared light paths to the front area or space of the screen.

(2) Second Embodiment Example

Figure 4:
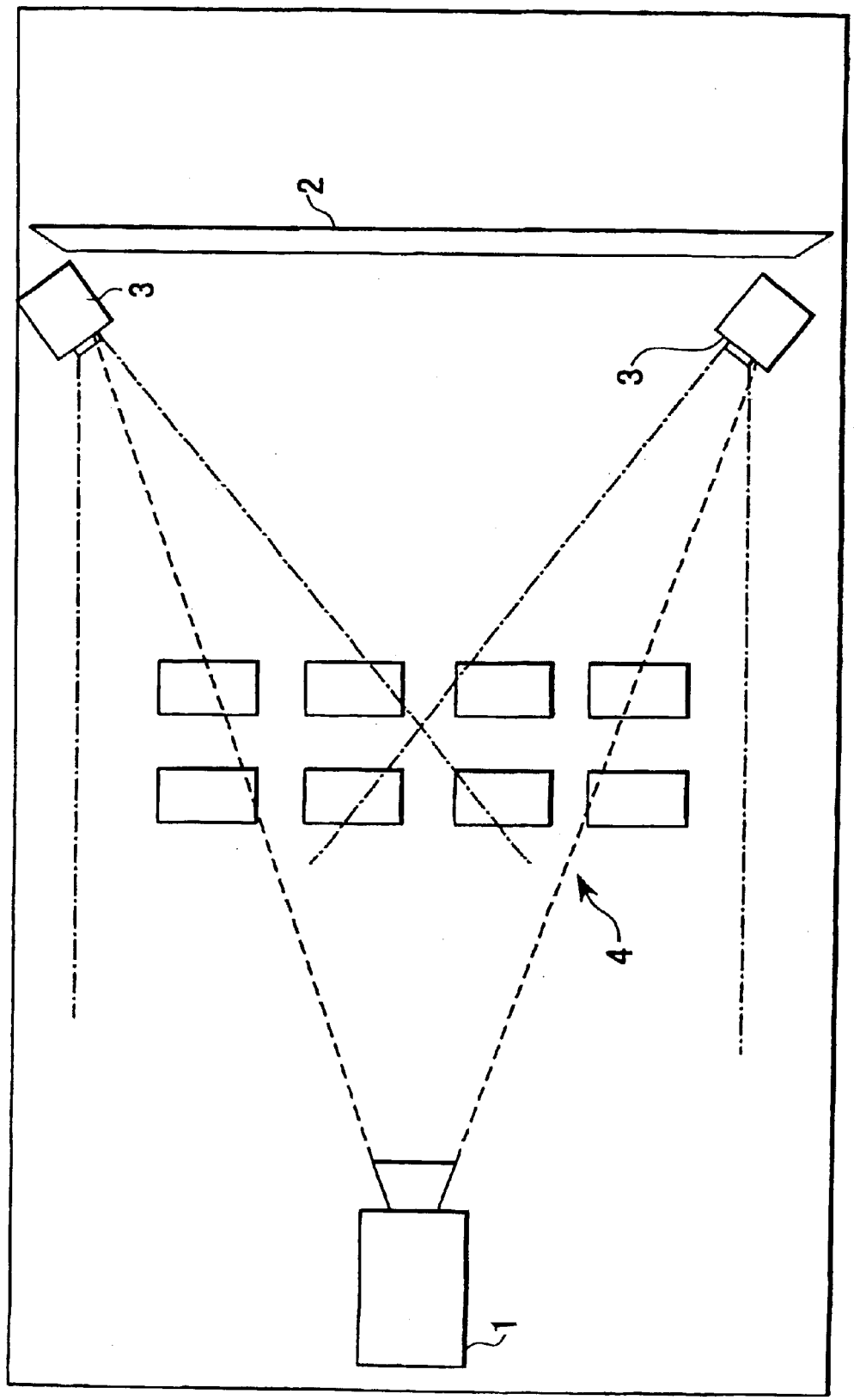
FIG. 4 is a schematic diagram illustrating one embodiment wherein infrared light is projected to a viewer/audience direction from a front side of a screen.

The second embodiment example is shown in FIG. 4. This embodiment example is related to a novel feature of projecting infrared light to a viewer/audience direction from a front side of the screen. FIG. 4 also shows an example applicable for a movie theater or other theater systems. Similar to the first embodiment example, the technique itself may be applicable to a home theater. Of course, the visual images projected onto the screen include television programs and the other copyrighted products as well as a movie. Next, a specific example of each apparatus composing the system shown in FIG. 4 will now be described. Here, an explanation of the projector apparatus 1 is omitted since it is similar to the first embodiment example.

Contrary to the first embodiment example, the screen 2 may have any arbitrary construction. That is, the screen of FIG. 4 may be a screen having a configuration capable of easily transmitting the infrared light, or a screen having a configuration capable of transmitting the infrared light, or a screen incapable of transmitting nor passing through the infrared light. This is because that the infrared light projector apparatus 3 is disposed in the front of the screen 2 and an existence of the screen does not interfere the incident of the infrared light into the imaging apparatus.

An apparatus construction itself of the infrared light projector apparatus 3 is the same as that of the first embodiment example. Differences are a location and a projection method of the infrared light projector apparatus 3 and so on. It is considered that a typical location of the infrared light projector apparatus 3 is at a vicinity of the both sides of the screen so as not to interfere the viewing of the main feature program. However, the position may be set an arbitrary location provided that the infrared light projector apparatus 3 is disposed at an audience seat side from the virtual reference plane including the screen surface.

For example, it may be disposed at a vicinity of the center of the screen's bottom hem below an area onto which the visual images are projected. Similarly, it may be disposed at a vicinity of the center of the screen's top hem above an area onto which the visual images are projected. Alternatively, it may be disposed at a side wall part in the audience seat side from the virtual reference plane including the screen surface. For the theater system such as a movie theater, it may be embedded in such a way that the infrared light can be projected to the opposite side of the screen at above the seat's backrest portion. In case that such construction is utilized, a great prevention effect may be anticipated since the infrared light may be projected from a close range to the imaging apparatus even when the infrared light projector apparatus 3 with rather low output is used. Alternatively, the infrared light projector apparatus 3 may be disposed at a ceiling above the audience seat. It is preferred to mount the infrared light projector apparatus 3 on a surface (audience side plane) of the screen 2 if it does not interfere the viewing.

Further, similar to the first embodiment example, a disposition height of the infrared light projector apparatus 3 is not limited to any particular value. The optimum height of the infrared light projector apparatus 3 may vary depending on a relationship of the audience seats 4 and the screen 2. In general, the infrared light projector apparatus 3 may be disposed within an imaging area (or imaging angle) of the imaging apparatus used for the unauthorized imaging.

Similarly, the projecting direction of the infrared light may be arbitrary determined provided that the projected light flux is directed to an area or space at where the unauthorized imaging may take place. At least, the following directions may be selected. The directions is such that the projected light flux can cover a region with a certain height where the imaging without any interference is possible within the area in which the audience seats 4 are disposed. Alternatively, in case that the light axis of the infrared light is changed by utilizing the infrared light reflection mirror (so-called hot mirror) or any other infrared light reflection unit, the light axis of the reflected infrared light may be needed to be directed to the above-mentioned region or space. Instead of reflecting the infrared light by the reflection mirror as mentioned the above, the light axis of the reflected infrared light may be directed to the above-mentioned region or space by driving the infrared light projector apparatus 3 itself. For example, the infrared light projector apparatus 3 may be driven in a horizontal direction so as that the reflected light scans the audience side.

Also in the above-cited cases, it is preferable to determine disposition (location and height) of the infrared light projector apparatus or projecting direction so as to reduce an angle difference between the optical axis of the imaging apparatus and the light axis of the infrared light as much as possible. This is because the infrared light becomes easier to be recorded and the prevention effect becomes larger when the angle difference between the optical axis of the imaging apparatus and the light axis of the infrared light is smaller.

Further, the infrared light may be a spread light having spread light flux, or a spot light having a tightened light flux. The infrared light may be a constantly emitted (light on) or an intermittently emitted. By intermittently projecting the infrared light, the viewing becomes difficult since the brightness of the recorded screen varies independently with respect to visual images of the main feature of a program. Intervals of the intermittent emission may be varied at random. By changing the emission interval randomly, it is possible to prevent elimination of the brightness changes from the visual images imaged by the unauthorized manner even with using image processing.

It is also possible to enable reading out of desired information from appearance timings or appearance locations of the light images by controlling the timing of the intermittent emission, or by controlling emission positions of the infrared light projector apparatus 3 when a plurality of the infrared light projector apparatus 3 are used. Any arbitrary intermittent emission methods described above may be utilized. Concrete emission methods will be described with the other embodiments in the following.

Also in this embodiment example, the number of the infrared light projector apparatus 3 is not limited to one. For example, FIG. 4 show cases where two of the infrared light projector apparatus 3 are used. Of course, three or more of the infrared light projector apparatus 3 or only one of the infrared light projector apparatus 3 may be disposed. FIG. 4 seems to show the infrared light projector apparatus 3 with single infrared light emission device. However, a plurality of the infrared light emission devices may also be mounted on the single infrared light projector apparatus 3. In this case, a simultaneous emission control of all the infrared light emission devices or an individual emission control may be performed at discretion.

The amount of the infrared light entering the imaging apparatus may be increased more than the first embodiment example by projecting the infrared light to the audience seats from the front side of the screen 2 as the present embodiment, more specifically by disposing the imaging apparatus for imaging visual images projected on the screen in the unauthorized manner and the infrared light projector apparatus 3 for projecting the infrared light to prevent such unauthorized imaging in a face-to-face position and by projecting the infrared light to directly incident into the imaging apparatus from the infrared light projector apparatus 3 at closer range than the first embodiment example.

Consequently, the prevention effect greater than that of a conventional system may be expected. Further, the infrared light projector apparatus 3 having a emission brightness (output) less than the conventional system may be used when only the prevention effect comparable to that of the conventional system is required. Accordingly, an economical effect may be promoted in the apparatus or its system.

In case that the infrared light transmits through the screen, the prevention effect greater than a conventional system may be realized since no reflection at the screen surface is required in the present embodiment while only the less than the adequate amount of the reflection light is anticipated in the conventional system technique. For example, in case that a rear projection type projector apparatus is included in the system, desired effect may not be obtained even when the conventional system is applied.

As described above, the system according to the present embodiment can achieve the prevention effect greater than the conventional system regardless of the infrared light paths to the front area or space of the screen.

(3) Third Embodiment Example

Figure 5:
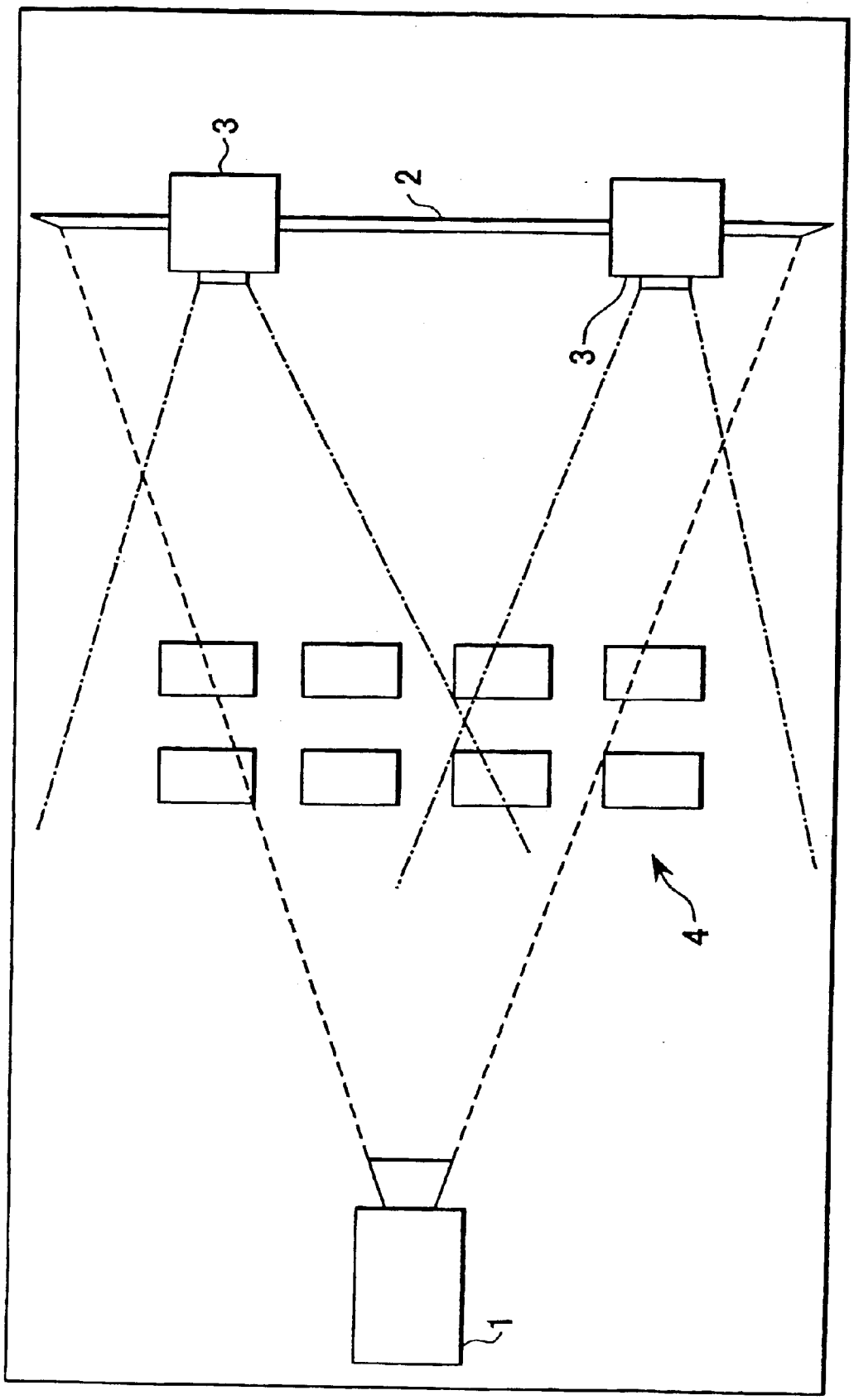
FIG. 5 is a schematic diagram illustrating one embodiment (part 1) wherein infrared light is projected to a viewer/audience direction from a vicinity of a screen.
Figure 6:
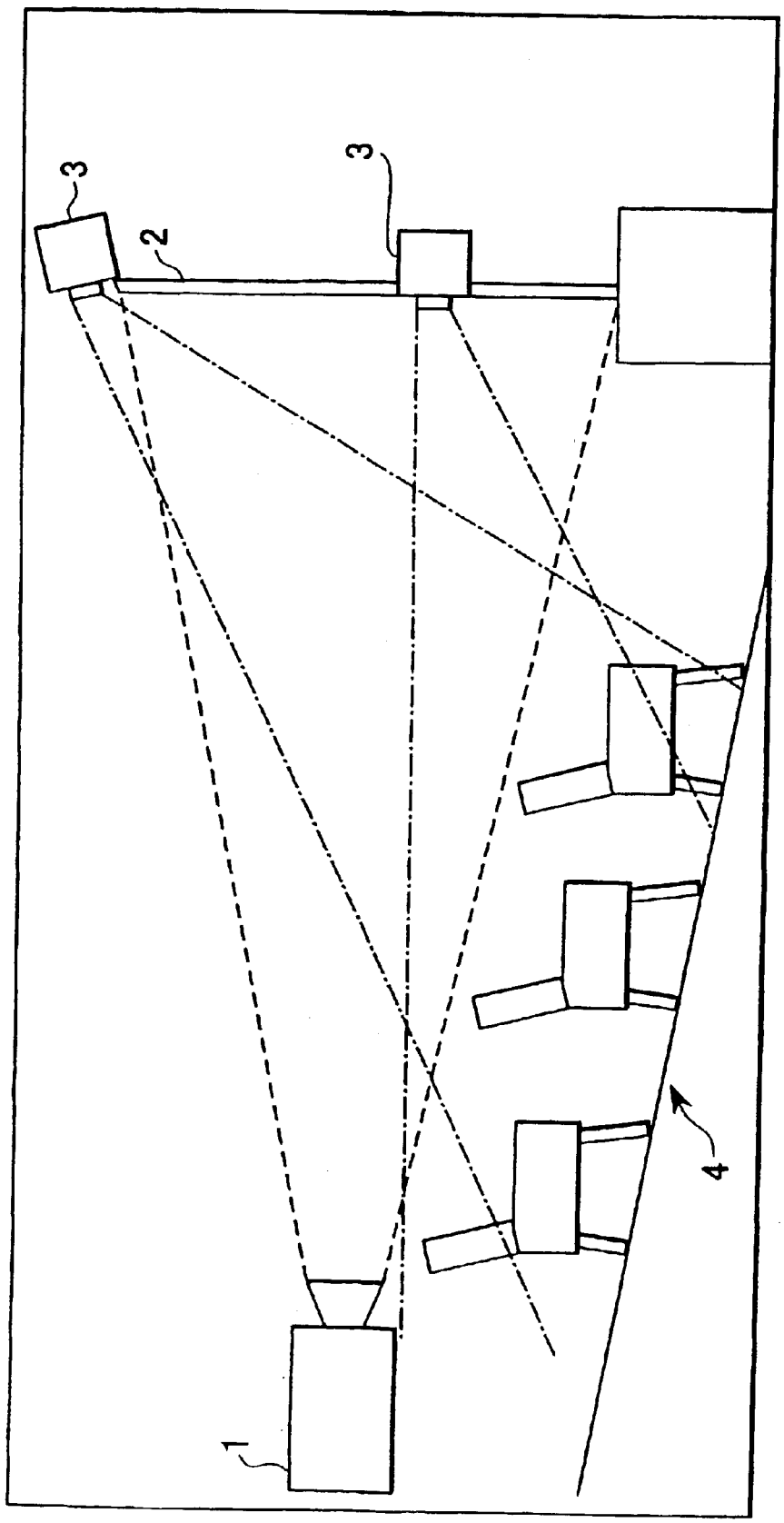
FIG. 6 is a schematic diagram illustrating one embodiment (part 2) wherein infrared light is projected to a viewer/audience direction from a vicinity of a screen.

The third embodiment example is shown in FIG. 5 and FIG. 6. This embodiment example is related to a novel feature of projecting infrared light to a viewer/audience direction from a side of the screen. FIG. 5 show an example of case in which the infrared light projector apparatus 3 is disposed outside (above) the top hem of the screen 2. FIG. 6 show an example of case in which the infrared light projector apparatus 3 are disposed outside (above) the top hem of the screen 2 and outsides of both left and right sides. All of figures shows application examples for the movie theater or any other theater system.

Similar to the first embodiment example, the technique itself may be applicable to a home theater. Of course, the visual images projected onto the screen include television programs and the other copyrighted products as well as a movie. Next, a specific example of each apparatus composing the system shown in FIG. 5 and FIG. 6 will now be described. Here, an explanation of the projector apparatus 1 is omitted since it is similar to the first embodiment example.

The screen 2 with the same construction as the second embodiment example is used. That is, the screen may be a screen having a configuration capable of easily transmitting the infrared light, or a screen having a configuration allowing infrared light pass-through, or a screen incapable of transmitting nor passing through the infrared light. This is because that the infrared light projector apparatus 3 is disposed around the screen 2 and an existence of the screen does not interfere the incident of the infrared light into the imaging apparatus.

An apparatus construction itself of the infrared light projector apparatus 3 is the same as that of the first embodiment example. Differences are a location and a projection method of the infrared light projector apparatus 3 and so on. It is considered that a typical location of the infrared light projector apparatus 3 is in a vicinity of the outer peripheral of the screen. Because the closer to an area to which the main feature program is projected, it is easier for the projected infrared light to be recorded in a typical case (inside the imaging area to be directly recorded, or higher probability to affect the imaging area) whereby promote the prevention effect. The prevention effect may not be necessary to be decreased even at space outside the screen outer peripheral since the probability of the infrared light recording is relative one determined by a relationship with an imaging angle of the imaging apparatus.

For example, as shown in FIG. 5, the infrared light may be easily projected over a wide range of area when two of the infrared light projector apparatus 3 are disposed in such a way that the infrared light projector apparatus 3 are contacting on the screen's top hem. For another example, as shown in FIG. 6, dead angles of the preventable areas, caused by mismatching of the light axes of the projected infrared lights and the optical system axis of the imaging apparatus, may be covered when a plurality of the infrared light projector apparatus 3 are disposed in such a way that the infrared light projector apparatus 3 are contacting on the screen's top hem and single infrared light projector apparatus 3 is disposed in both sides (light and left) of the screen. For an example of FIG. 6, the infrared light projected from the top part of the screen may not incident into the imaging apparatus positioned in the back side of the audience seats (particularly in FIG. 6, slanting of the audience seat floor may also be one of the causes). However, the ample amount of the infrared light may be directly projected to the audience seats located in the back side by projecting the infrared light from the both sides (right and left) whereby eliminating the dead angles of the preventable areas in the system as a whole. In order to produce no dead angle in the audience seats in the top front row, it is effective to dispose the infrared light projector apparatus at outside the screen's bottom hem or to combine with the first embodiment example technique, namely the technique in which the infrared light is projected from the rear side of the screen.

Further, similar to the first embodiment example or the second embodiment example, a disposition height of the infrared light projector apparatus 3 is not limited to any particular value. The optimum height of the infrared light projector apparatus 3 may vary depending on a relationship of the audience seats 4 and the screen 2.

Similarly, the projecting direction of the infrared light may be arbitrary determined provided that the projected light flux is directed to an area or space at where the unauthorized imaging may take place. At least, the following directions may be selected. The directions is such that the projected light flux can cover a region with a certain height where the imaging without any interference is possible within the area in which the audience seats 4 are disposed. Alternatively, in case that the light axis of the infrared light is changed by utilizing the infrared light reflection mirror (so-called hot mirror) or any other infrared light reflection unit, the light axis of the reflected infrared light may be needed to be directed to the above-mentioned region or space. Instead of reflecting the infrared light by the reflecting mirror as mentioned the above, the light axis of the reflected infrared light may be directed to the above-mentioned region or space by driving the infrared light projector apparatus 3 itself. For example, the infrared light projector apparatus 3 may be driven in a horizontal direction so as that the reflected light scans the audience side.

Also in the above-cited case, it is preferable to determine disposition (location and height) of the infrared light projector apparatus or projecting direction so as to reduce an angle difference between the optical axis of the imaging apparatus and the light axis of the infrared light as much as possible. This is because the infrared light becomes easier to be recorded and the prevention effect becomes larger when the angle difference between the optical axis of the imaging apparatus and the light axis of the infrared light is smaller.

Further, the infrared light may be a spread light having spread light flux, or a spot light having a tightened light flux. The infrared light may be a constantly emitted (light on) or an intermittently emitted. By intermittently projecting the infrared light, the viewing becomes difficult since the brightness of the recorded screen varies independently with respect to visual images of the main feature of a program. It is also possible to enable reading out of desired information from appearance timings or appearance locations of the recorded light images by controlling the timing of the intermittent emission, or by controlling emission positions when a plurality of the infrared light projector apparatus 3 are used. Any arbitrary intermittent emission methods described above may be utilized. Concrete emission methods will be described with the other embodiments in the following.

Also in this embodiment example, the number of the infrared light projector apparatus 3 is not limited to one. For example, FIG. 5 show cases where two of the infrared light projector apparatus 3 are used. Of course, three or more of the infrared light projector apparatus 3 or only one of the infrared light projector apparatus 3 may be disposed. FIG. 5 seems to show the infrared light projector apparatus 3 with single infrared light emission device. However, a plurality of the infrared light emission devices may also be mounted on the single infrared light projector apparatus 3. In this case, a simultaneous emission control of all the infrared light emission devices or an individual emission control may be performed at discretion.

The amount of the infrared light entering the imaging apparatus may be increased more than the first embodiment example by projecting the infrared light to the audience seats from the vicinity of the screen 2 as the present embodiment, more specifically by disposing the imaging apparatus for imaging visual images projected on the screen in the unauthorized manner and the infrared light projector apparatus 3 for projecting the infrared light to prevent such unauthorized imaging in a face-to-face position and by projecting the infrared light to directly incident into the imaging apparatus from the infrared light projector apparatus 3 at closer range than the first embodiment example.

Consequently, the prevention effect greater than that of a conventional system may be expected. Further, the infrared light projector apparatus 3 having a emission brightness (output) less than the conventional system may be used when only the prevention effect comparable to that of the conventional system is required. Accordingly, an economical effect may be promoted in the apparatus or its system.

In case that the infrared light transmits through the screen, the prevention effect greater than a conventional system may be realized since no reflection at the screen surface is required in the present embodiment while only the less than the adequate amount of the reflection light is anticipated in the conventional system technique. For example, in case that a rear projection type projector apparatus is included in the system, desired effect may not be obtained even when the conventional system is applied.

As described above, the system according to the present embodiment can achieve the prevention effect greater than the conventional system regardless of the infrared light paths to the front area or space of the screen.

(4) Fourth Embodiment Example

Figure 7:
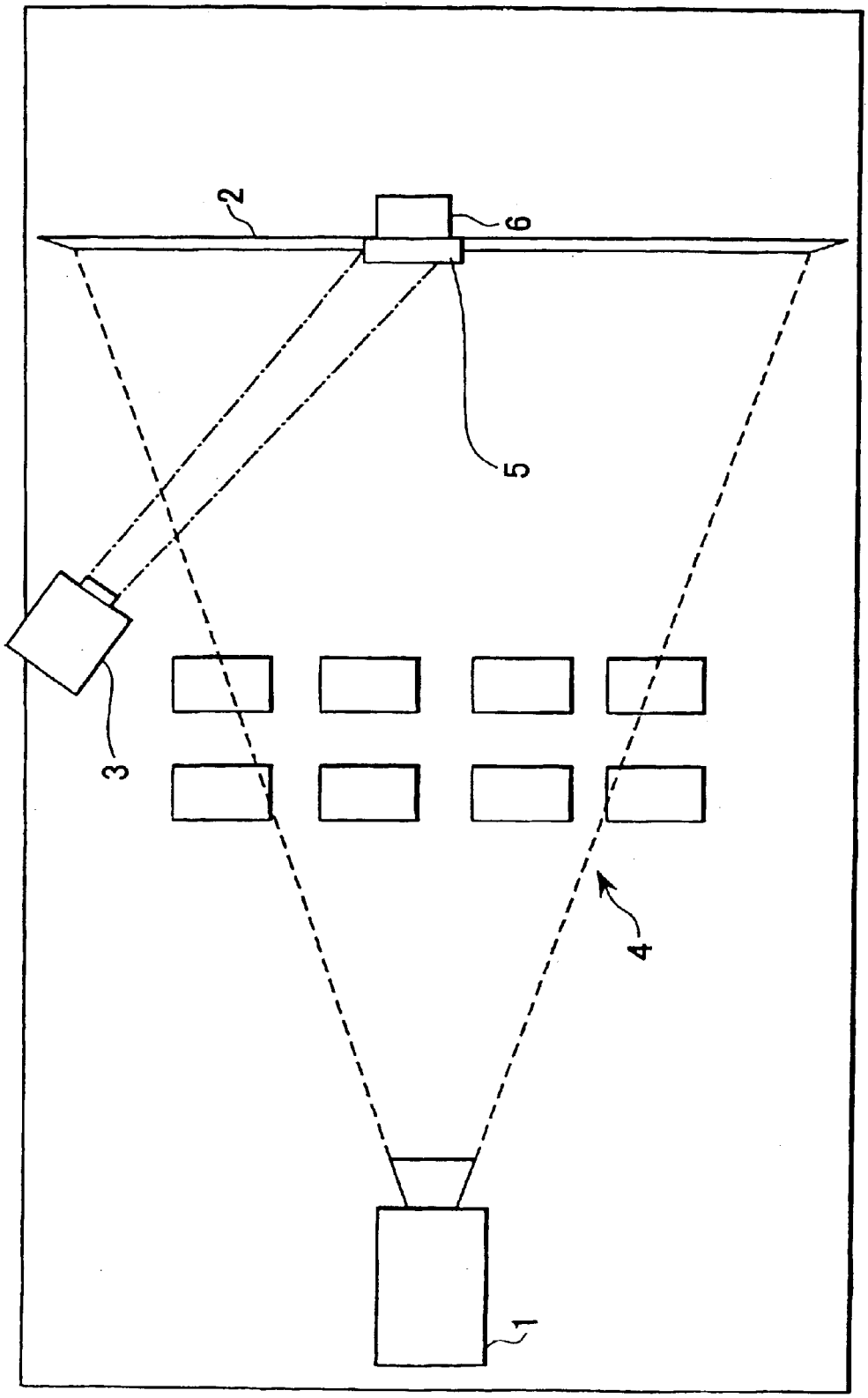
FIG. 7 is a schematic diagram illustrating one embodiment wherein reflection means of high reflection ratio for infrared light is employed.

The fourth embodiment example is shown in FIG. 7. This embodiment example is related to a novel feature of projecting infrared light to a infrared light reflection mirror 5 having a high reflection ratio and for enabling the reflected light incident into the imaging apparatus of a person conducting the unauthorized act. In a system shown in FIG. 7, a reflection direction itself may be variable by driving the infrared light reflection mirror 5 with an actuator apparatus 6.

FIG. 7 shows an application example of a movie theater or any other theater systems. Similar to the first embodiment example, the technique itself may also be applicable to a home theater. Of course, the visual images projected onto the screen include television programs and the other copyrighted products as well as a movie. Next, a specific example of each apparatus composing the system shown in FIG. 7 will now be described. Here, an explanation of the projector apparatus 1 is omitted since it is similar to the first embodiment example.

The screen 2 may be different depending at where the infrared light reflection mirror 5 is disposed. In the example of FIG. 7, the infrared light reflection mirror 5 is disposed in a vicinity of the screen 2. Accordingly, the same construction may be applied as the third embodiment example when the reflection surface is identified as the projection source of the infrared light. In this case, any arbitrary materials or constructions may be used as the screen of the third embodiment example. The same applies to a case of disposing the infrared light reflection mirror 5 in the front of the screen 2.

In case that the infrared light reflection mirror 5 is disposed in the rear side of the screen so as that the reflected light is projected to the audience seat side via passing or transmitting through the screen 2, the particular construction or material should be used as the screen of the first embodiment example. Alternatively, any arbitrary constructions may be applied to the screen 2 as the second embodiment example and the third embodiment example even in case that the infrared light reflection mirror 5 is disposed in the rear side of the screen provided that the reflected light passes through space outside of the screen.

An apparatus construction itself of the infrared light projector apparatus 3 is the same as that of the first embodiment example. Differences are a location and a projection method of the infrared light projector apparatus 3 and so on. A disposition location of the infrared light projector apparatus 3 may be determined by a relationship with the reflection surface of the infrared light reflection mirror 5.

For example, the infrared light projector apparatus 3 is disposed closer to the audience seat side than the infrared light reflection mirror 5 whatever the physical relationship of the infrared light reflection mirror 5 and the screen 2 may be provided that the reflection surface of the infrared light reflection mirror 5 is positioned parallel or substantially parallel to the screen 2 as shown in FIG. 7. Of course, this is to direct the reflected light to the audience seat direction.

On the other hand, the infrared light projector apparatus 3 is disposed the back side of the infrared light reflection mirror 5 (viewing from the audience seat side to the screen direction) whatever the physical relationship of the infrared light reflection mirror 5 and the screen 2 may be provided that the reflection surface of the infrared light reflection mirror 5 is positioned perpendicular or substantially perpendicular to the screen 2. In this case, an incident angle (angle with respect to the normal direction of the reflection surface) of the infrared light typically becomes larger with respect to the reflection surface.

In any of the above cited cases, the infrared light is projected from the infrared light projector apparatus 3 so as that the infrared light reflected shines over at least a part of areas or regions in which the unauthorized act may be performed. The positional relationship of the reflection surface and the screen is not limited to the above cases, and the positional relationship falls in somewhere in the middle of the above cases may also be utilized. Of course, the optimum position or the optimum projection direction of the infrared light projection apparatus 3 may be different depending on the physical relationship with the reflection surface of the infrared light reflection mirror 5.

In an example of FIG. 7, the reflection direction of the infrared light may be configured as variable even that the projecting direction of the infrared light projector apparatus 3 is fixed since the infrared light reflection mirror 5 (reflection surface) may be driven with the actuator apparatus 6 whereby producing no dead angle in the imaging preventable area.

The infrared light reflection mirror 5 (reflection surface) is configured as movable in this embodiment example, no dead angle may be produced in the imaging preventable area even in case that the infrared light reflection mirror 5 (reflection surface) is fixed (namely, no actuator apparatus 6 is not included in the configuration) by disposing a plurality of the infrared light projector apparatus 3 in various positions and reflecting the infrared lights projected from each of the infrared light projector apparatus 3. Alternatively, the reflection direction may be configured as variable by driving the infrared light projector apparatus 3 with the actuator apparatus 6 and reflecting by the infrared light reflection mirror 5.

The infrared light reflection mirror 5 is a mirror with a high infrared light reflection ratio. A high reflection ratio may be preferred not only for the infrared light but also for light in the other frequency band. Of course, it is preferable to have low reflection ratio for visible light. In case that the infrared light reflection mirror 5 is disposed at a location at which there is no possibility of entering the visible light, the high reflection ratio for the visible light may cause no trouble.

The infrared light reflection mirror 5 may have a plate-type shape or a shape like a concave or a convex mirror. In case that the convex mirror is used, there is a merit of reflecting the infrared light in a wide area even when the projecting direction of the infrared light is fixed or a movable range of the infrared light reflection mirror 5 is limited (including a case of being fixed). In this case, a spread light flux may be used for the infrared light to be projected.

The infrared light reflection mirror 5 may be a one-sided mirror having single reflection surface only at one side, or two-sided mirror having reflection mirrors in both sides. The infrared light reflection mirror 5 may be constructed from single mirror or constructed as assembled body comprising a plurality of mirrors. For example, it may be constructed by arraying a plurality of micro mirrors on a plane.

Alternatively, it may be constructed by arraying a plurality of micro mirrors so as to form a polyhedron body (including a sphere) as a whole.

When the infrared light reflection mirror 5 has the polyhedron form, it is possible to be used for reflecting single light flux into a plurality of directions even the infrared light reflection mirror 5 is fixed. Of course, in case that the polyhedron form is employed and moved, the reflection light may be reflected to a wide area by largely changing angles of the reflection surfaces with a small amount of the movement.

Although the infrared light reflection mirror 5 is utilized in FIG. 7, the reflection surface is not necessary to have a mirror surface provided that it can reflect the infrared light with a high reflection ratio. That is, means for reflecting the infrared light may include not only the infrared light reflection apparatus but also a scattering plate or the like.

Further, only one infrared light reflection mirror 5 is disposed at a vicinity of the center of the screen's top hem in FIG. 7. However, the disposition and the number of the infrared light reflection mirror 5 are not limited to those of FIG. 7. For example, it may be disposed in a vicinity of the center of the screen's bottom hem, or in vicinities of both sides (right and left hem) of the screen. Of course, it is not limited to the center vicinity of each hem but may be disposed in any positions. Further, it may disposed not only at the vicinity of the screen but disposed by a side wall or ceiling, or the front or rear side of the screen, or any other various positions. Of course, the number is not limited to one but the infrared light reflection mirror 5 may be disposed in a plurality of positions.

Figure 8:
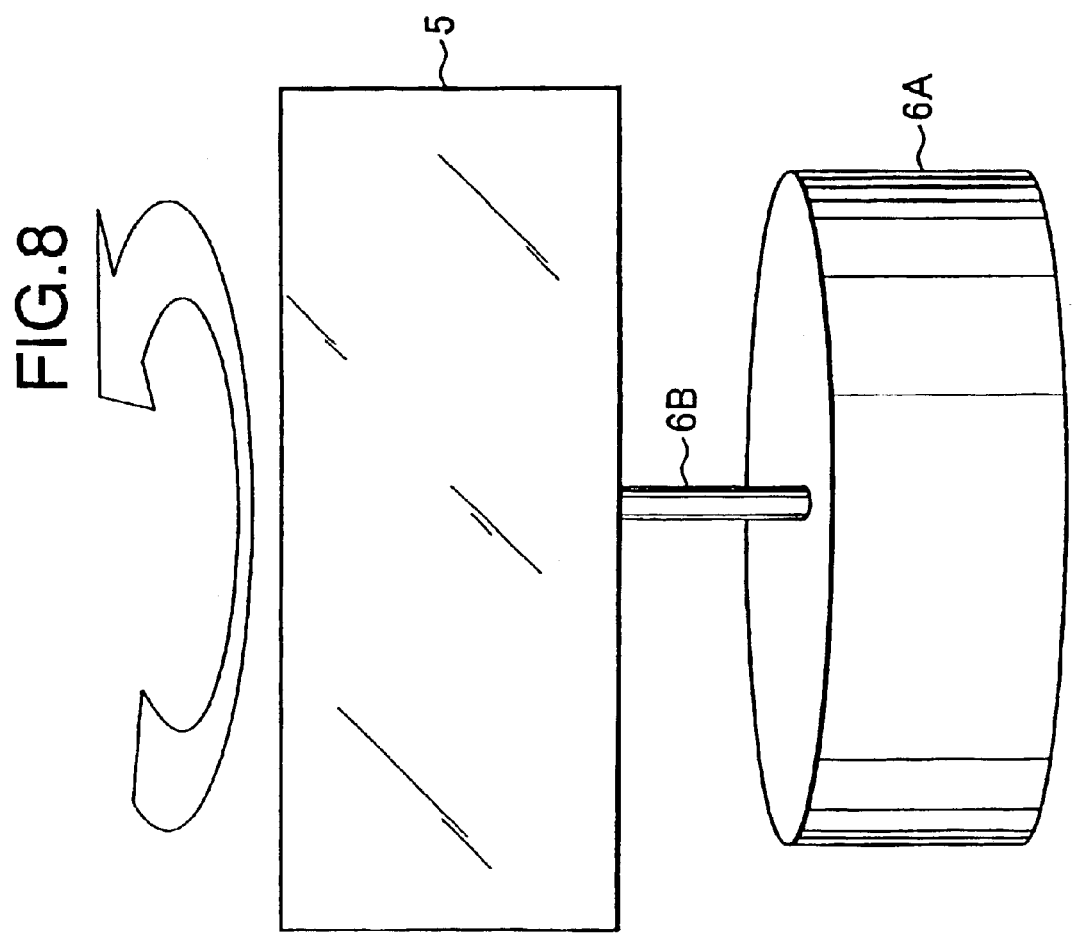
FIG. 8 is a schematic diagram illustrating an example of actuator apparatus for the reflection means of high reflection ratio.

The actuator apparatus 6 is means for changing the reflection direction of the infrared light by driving the infrared light reflection mirror 5 or its reflection surface. FIG. 8 shows an example of the actuator apparatus. The apparatus shown in FIG. 8 has a motor 6A and a rotation axis 6B as principle units. In case of FIG. 8, the infrared light reflection mirror 5 mounted on the rotation axis 6B is rotationally driven to one direction (360 degree) by the motor 6A. That is, it becomes possible to horizontally scan the audience seat side with the infrared light by changing the angle of the reflection surface (the infrared light reflection mirror 5 itself in case of FIG. 8).

An appropriate value of the rotation angle or the rotation speed is selectively used in accordance with effects to be achieved. For example, the following drive method may be used. The method is to drive the infrared light reflection mirror 5 in reciprocating manner within the minimum range (for example 90 degree) required for scanning the audience seats with the reflected light. The driving speed may be a low speed such that single infrared light scanning is completed within a period of plural frames to a high speed such that plural infrared light scanning are performed within a period of single frame. A difference of the driving speed relates to a frequency of the light image appearance in the visual images imaged in the unauthorized manner.

In case of the actuator apparatus of FIG. 8, it is shown a case that the drive axis of the actuator apparatus 5 is a single-axis. However, it is also applicable to a case in which the drive axis is a two-axis of different directions such as horizontal and vertical directions. With increasing the drive axis having a different axis direction, it is possible to expand the area to be covered by the scanning with the infrared light. Of course, the drive axis is not limited to the two-axis, and may be the three-axis or more. Although the most simple actuator mechanism in which the infrared light reflection mirror 5 is fixed on the rotation axis 6B of the motor 6A is shown in FIG. 8, a gear or any other mechanisms, or, a rubber or any other elastic members may be utilized as means for transmitting power of the motor 6A. Further, it is possible to contemplate that the power source may be ones using a rotational direction like the motor 6A, or ones using a linear direction like a linear motor, or ones utilizing elastic waves like a elastic wave motor, or ones utilizing an electromagnet, or the like. For example, the infrared light reflection mirror 5 may be moved horizontally along a hem of the screen 2 whereby moving the area illuminating the reflected infrared light.

FIG. 8 shows an example of the actuator apparatus in case that the infrared light reflection mirror 5 is formed with single mirror. However, in case that the infrared light reflection mirror 5 is formed from a plurality of mirrors as means for reflecting the infrared light, it is possible to provide actuator apparatus for each of the reflection mirrors to drive them independently.

The amount of the infrared light entering the imaging apparatus may be increased more than the first embodiment example by disposing the infrared light reflection mirror 5 that reflecting the infrared light to the audience seats as the present embodiment, more specifically by reflecting the infrared light to the audience seats using the infrared light reflection mirror 5 with a reflection ratio greater than the screen.

Consequently, the prevention effect greater than that of a conventional system may be expected. Further, the infrared light projector apparatus 3 having a emission brightness (output) less than the conventional system may be used when only the prevention effect comparable to that of the conventional system is required. Accordingly, an economical effect may be promoted in the apparatus or its system.

Further, it is possible to realize the effect of reflecting an intense infrared light in a wide range by means of driving the infrared light reflection mirror 5 or its reflection surface with the actuator apparatus 6 and by variably changing the reflection direction of the infrared light reflected by the reflection surface. This effect may not be realized with the conventional system having the fixed reflection surface.

In the present embodiment, it is described the case that the single plate of the infrared light reflection mirror 5 is driven so as to move the area illuminating the reflected light. However, the following technique may also be utilized. The technique is to dispose a plurality of the infrared light projector apparatus 3 each having the different projection direction (incident angle with respect to the infrared light reflection mirror 5) of the infrared light and to control them to emit one by one so as to scan the audience seat side with the reflected light. Alternatively, the large area may be illuminated at once by projecting to the single infrared light reflection apparatus 5 from a plurality of the infrared light projector apparatus 3 having the different projection directions (incident angle with respect to the infrared light reflection mirror 5) of the infrared light.

(5) Fifth Embodiment Example

Figure 9:
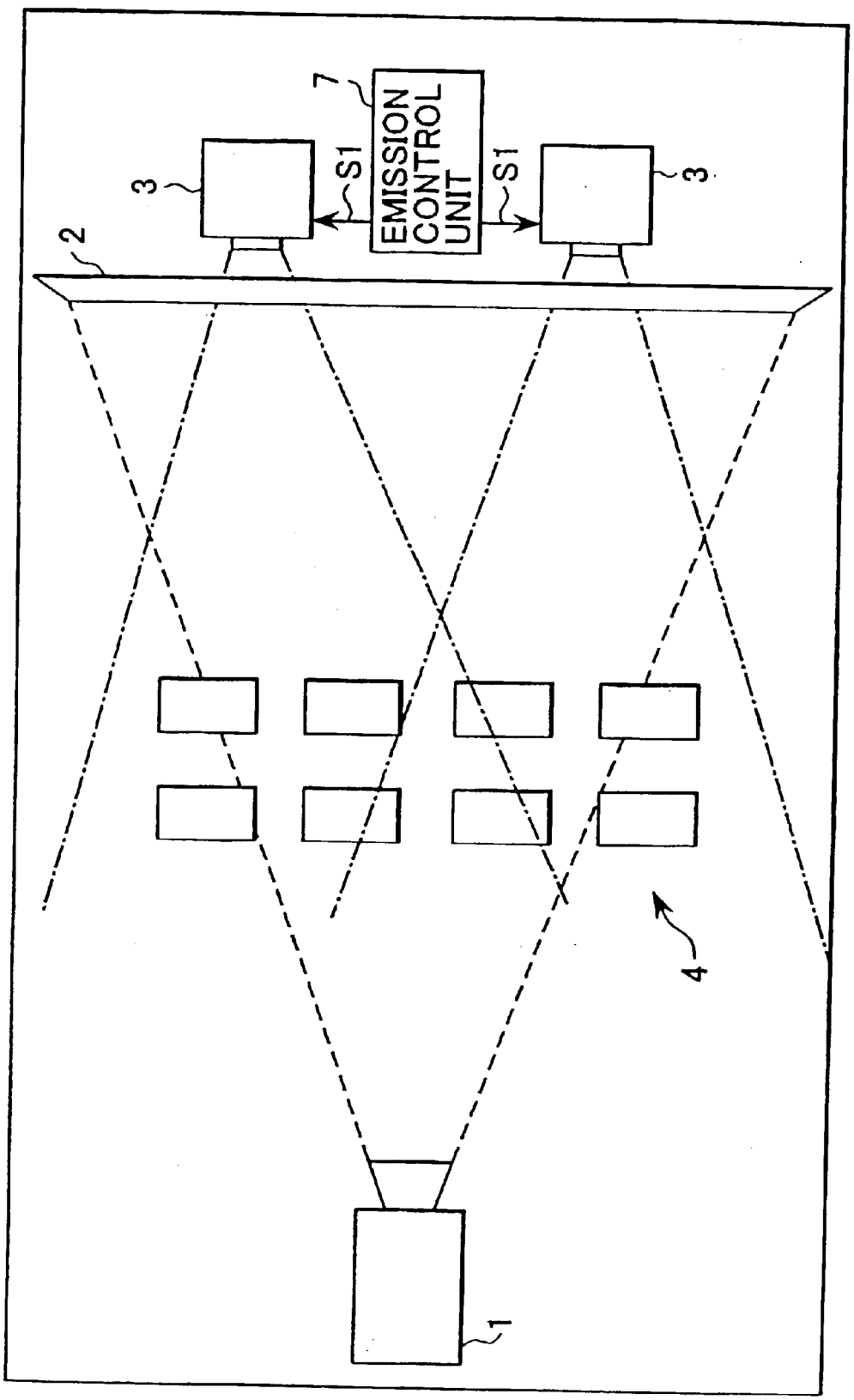
FIG. 9 is a schematic diagram illustrating one embodiment wherein infrared light is emitted intermittently.

The fifth embodiment example is shown in FIG. 9. This embodiment example is related to a novel feature of enabling a recording of light image pattern irrelevant to the main feature program with the visual images recorded in the unauthorized manner by intermittently emitting the infrared light. This embodiment may be applicable to a conventional system (system in which the infrared light is projected to the screen 2 from a vicinity of the projector apparatus or any other distant locations so as that the infrared light reflected may be entered into the imaging apparatus of a person who is conducting the unauthorized act) as well as the above-cited embodiments or the other embodiments. FIG. 9 show an configuration example of a case in which the present invention is applied to the first embodiment example.

Similar to the other embodiment examples, the present embodiment may be applicable to a home theater as well as a movie theater or any other theater system. Of course, the visual images projected onto the screen include television programs and the other copyrighted products as well as a movie. Next, a specific example of each apparatus composing the system shown in FIG. 9 will now be described. Here, explanations are omitted except an emission control unit 7 since they are similar to the first embodiment example. The same applies to case where the present embodiment is combined with the other embodiment examples.

The most simple emission control method is an emission pattern in which light-on and light-off are repeated in turn with a base cycle. In this case, the emission control unit 7 may be realized by, for example, an oscillator, a multi-vibrator, or any other oscillation means. In such case, the emission control unit 7 may also be constructed with a computer, an IC for specific purpose, or any other logic circuits. The intermittent emission of the infrared light can cause difficulties in the viewing even the infrared light image is not bright in the recorded visual image since the inter-mittently emitted infrared light is easier to be recognized. Of course, it is possible to deteriorate the visual image that is imaged in the unauthorized manner as much as the viewing becomes very difficult in case that brightness of the recorded light image is high since a change of the brightness level may be set to large.

In case that more complex control is required, it is necessary to have a recording unit for an emission code (or emission pattern) indicating a predetermined information (for example output date, output location, screen number or the like) to be recorded, and an output unit for reading out an emission control information (light-on and light-off) signal according to the emission code from the recording unit to output. Of course, in order to automatically convert the emission code according to an arbitrary prescribed information inputted by a supervisor, it is preferred to further include a conversion table or any other converting means for converting the prescribed information to the emission code.

Further, as shown in FIG. 9, the emission control unit 7 may be an apparatus independent from the infrared light projector apparatus 3, or may be provided inside of the infrared light projector apparatus 3 composing a single unit. In case that the emission control unit 7 is provided inside of the infrared light projector apparatus 3 composing the single unit and a plurality of the infrared light projector apparatus 3 are used, synchronizations among these apparatus are adopted.

Next, the other emission control methods are described. A basic emission control method is dedicated for disabling the viewing of recorded visual images. However, a desired information may be recorded by controlling the intermittent emission itself. Of course, the emission control unit 7 controls the emission timing.

For example, as shown in FIG. 10, the desired information may be embedded along the time axis by assigning data "1" of binary code to Light-On and "0" to Light-Off in case that the emission code "10001110010" is indicating a movie theater ID of "001". In FIG. 10, it may be seen that 1 frame (1 field) is the minimum unit of the light-on and the light-off. However, the minimum unit required for indicating single value of the emission code may be arbitrarily varied. For example, 0.5 second or 1 second may be used for the minimum unit. In case that the unauthorized imaging act is performed, such light images are recorded so as to not only disable the viewing of the recorded visual images but also identify a location where the unauthorized imaging was taken place when such the recorded visual image is placed in a market. Although FIG. 10 shows a case in which single emission source is used, the emission control can be similarly performed with a plurality of the emission sources.

FIG. 11 shows another control method for embedding a desired information along the time axis. In the above cited case of FIG. 10, recording position of the light image is fixed (namely, the emission source is fixed). However, it is possible to transit the recording position of the light image itself in a relay form as shown in FIG. 11. No meaning is provided in the recording position of the light image in case of FIG. 11. Also in this way, the same information as FIG. 11 may be recorded.

FIG. 11 shows the emission pattern and its recording example for a case that four positions at four corners of the screen are assigned as recording positions where the infrared light images are to be recorded and a rule is applied to advance the recording position of the light image in a clock wise direction every time the emission code value changes from "0" to "1". Of course the other rules may be applied, too. For example, the following may be contemplated. The rule may include a rule of advancing the recording position of the light image in a clockwise direction every time "1" is appeared in the emission code, a rule of advancing the light image in a counter clockwise, a rule of transiting the light image to a point other than the neighboring light image candidate point in accordance with a predetermined emission position transition rule, or the like.

FIG. 12 shows another control method for embedding a desired information along the time axis direction. FIG. 12 shows a method for realizing recording of the information by assigning "1" and "0" of the emission code to combination patterns in which a plurality of the light images are appeared. This is an example in which the appearance position of the light image also has meaning. FIG. 12 shows an recording example of a case in which "0" of the emission code is assigned to a combination pattern in which two of the light images are appeared in the upper left corner and the lower right corner respectively, and "1" of the emission code is assigned to a combination pattern in which the light images is appeared only in the upper left corner. With using the control method, it is possible to identify the location where the unauthorized act was performed. Of course, the positions at which the infrared light image is recorded may be positions other than the four corners of the screen, and the combination patterns indicating each code vale may use the other ones. For example, in the above cited case, "1" of the emission code may be assigned to a combination pattern in which two of the light images are appeared in the upper right corner and the lower left corner respectively.

Figure 13:
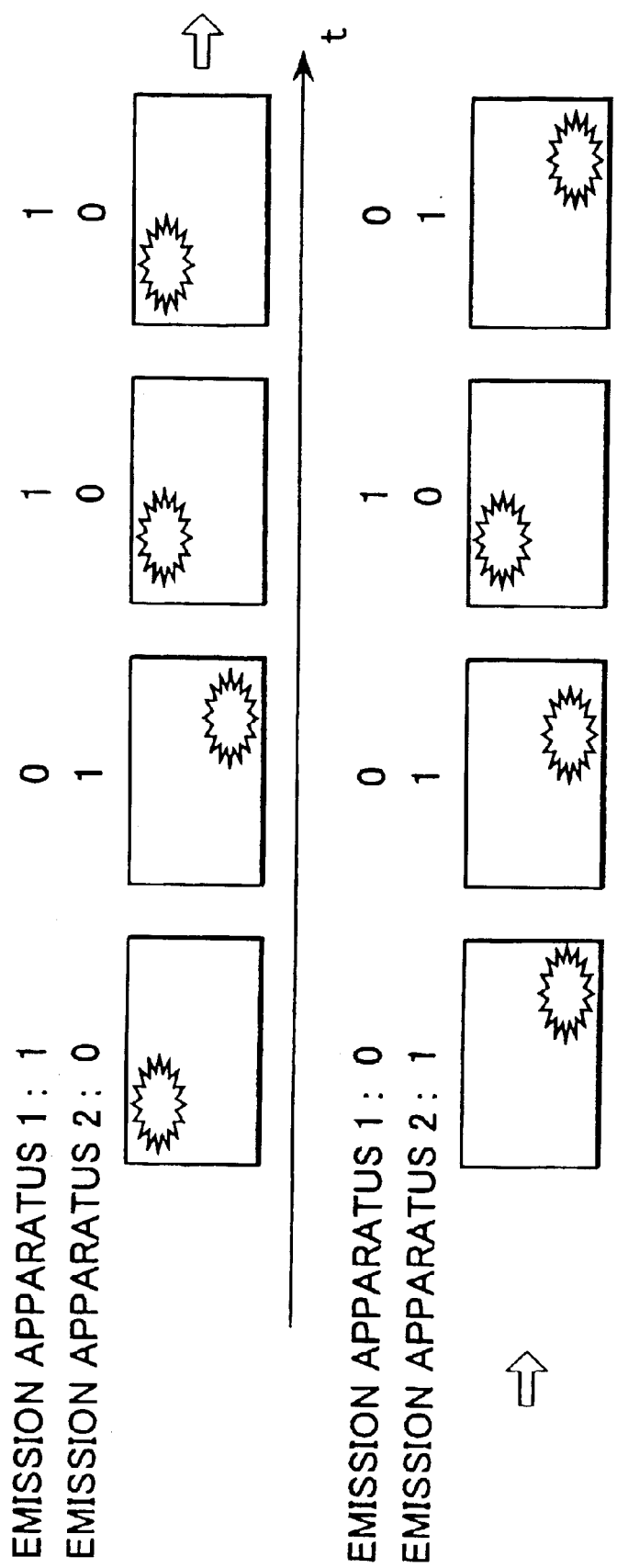
FIG. 13 is a schematic diagram illustrating an example of emission pattern (part 4) for a case in which infrared light is emitted intermittently.

FIG. 13 shows an modification example of FIG. 12. In the case of FIG. 12, "0" and "1" of the emission code are assigned to the combination patterns of the light image. However, in this example, only single light image is assigned. That is, meaning is provided on the appearing position. In FIG. 13, "0" of the emission code corresponds to the light image appeared at the upper left corner of the screen, "1" of the emission code corresponds to the light image appeared at the lower right corner of the screen. As to the synchronized control of emission timing of two light images, FIG. 13 is one of the controller of FIG. 12.

Examples described in the above are the cases where each of the light image patterns appeared along the time axis direction has own meaning. However, the following method may be contemplated, too. That is, the method is to superpose information on the light image pattern itself. For example, as shown in FIG. 14, the following case may be contemplated. In such case, only a pattern of the light image positions appeared in a predetermined time period has meaning and no meaning is attached to the transition of the light image appearance position nor their appearance order when the appearance position of the light image transits as time elapse. That is, FIG. 14 shows a case in which the light image appearance position is transited "upper left corner -> lower right corner -> upper left corner -> lower left corner -> upper left corner -> lower right corner" whereby providing meaning to a light image pattern itself recognized at a plane independent of the time axis (time axis compressed). Here, the predetermined information is indicated by light image patterns appeared at corners excluding the upper right corner. The emission control method intending such superposition of the information may also be contemplated. It is possible to contemplate an emission control method intending to use such information superposition. Alternatively, the emission may be controlled so as that the light images appear at three points except the upper right corner simultaneously.

It becomes possible to record the predetermined information in addition to disabling the viewing by performing the intermittent emission control of the infrared light like the present embodiment example, namely by intermittently projecting the infrared light image (spot light) on the screen. Further, in case that the information is superposed on the intermittent emission itself, the light image itself may be recognized independent of the main feature program content or the brightness since a large spot light that is easily recognizable may be used. On the other hand, in case that character information is recorded by focusing the infrared light on the screen like the conventional system, there may be some difficulties in reading out the character information depending on the main feature program content or the brightness.

In the explanation described above, it is basically assumed that single information is to be recorded (in this case the same pattern is repeatedly appeared with a predetermined interval). However, in case that a plurality of information are to be recorded, a control may be performed so as to project light image patterns corresponding to the different information with a predetermined interval.

(6) Sixth Embodiment Example

Figure 15:
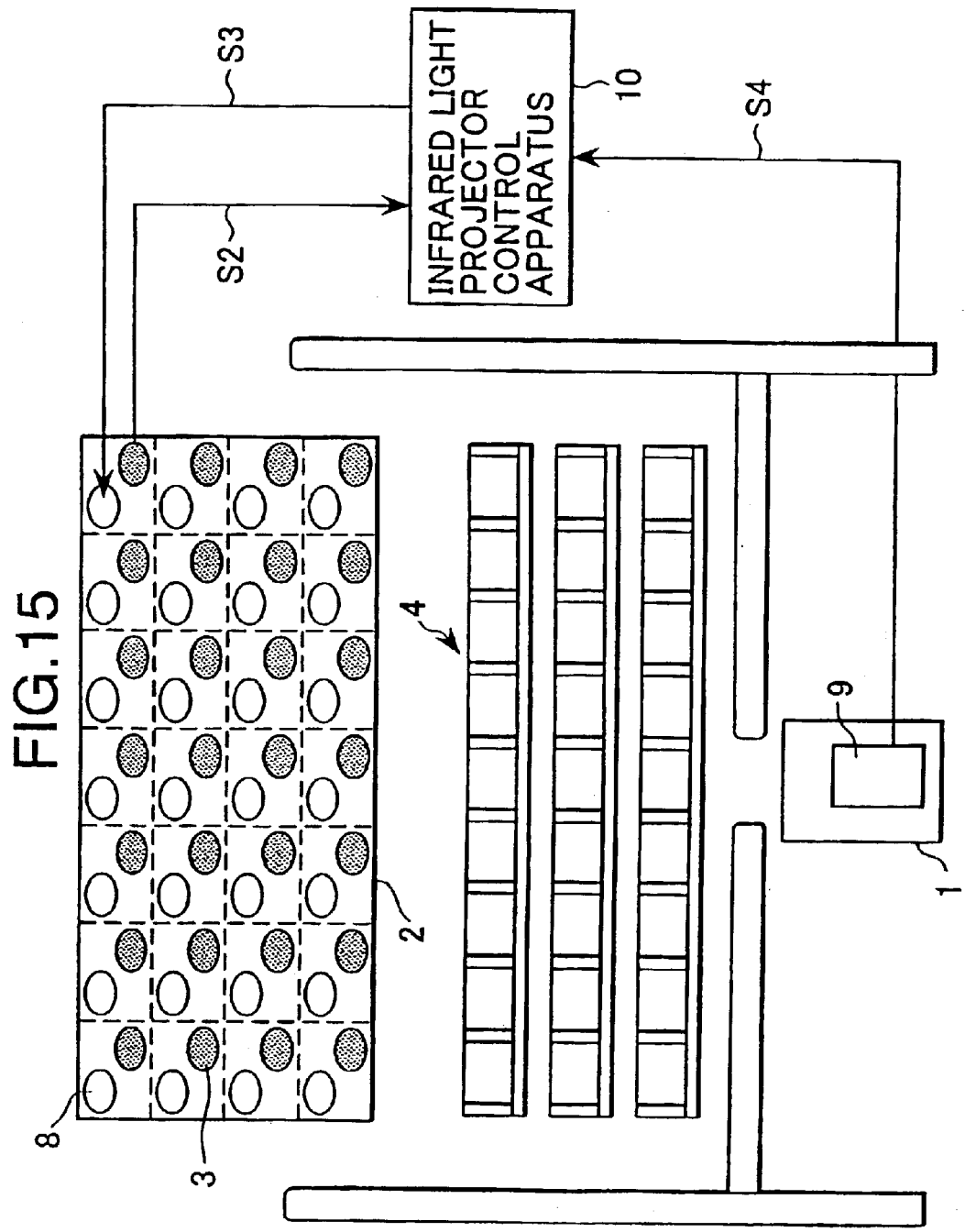
FIG. 15 is a schematic diagram illustrating one embodiment (part 1) wherein infrared light is selectively projected onto scene or area in the screen of low brightness.

The sixth embodiment example is shown in FIG. 15. This embodiment example is related to a novel feature of projecting the infrared light onto the screen during scenes of the low brightness or for selectively projecting the infrared light onto screen surface areas having low brightness whereby increasing the prevention effect with the infrared light. This embodiment may be applicable to a conventional system (system in which the infrared light is projected to the screen 2 from a vicinity of the projector apparatus or any other distant locations so as that the infrared light reflected is entered into the imaging apparatus of a person who is conducting the unauthorized act) as well as the above-cited embodiments or the other embodiments.

FIG. 15 shows an application example of a movie theater or any other theater system. However, like the other embodiment examples, the technique itself may be applicable to a home theater. Of course, the visual images projected onto the screen include television programs and the other copyrighted products as well as a movie.

Next, a specific example of each apparatus composing the system shown in FIG. 15 will now be described. The system shown in FIG. 15 is to dispose the infrared light projector apparatus 3 at the rear side of the screen like the system related to the first embodiment example. As to this point, the present embodiment example is one example of the first embodiment example. The same projector apparatus 1 and the same screen 2 are used as the first embodiment example. Of course, the same infrared light projector apparatus 3 is used as the first embodiment example. That is, the infrared light projector apparatus 3 may be disposed not only the rear side of the screen but also disposed in the front side or a vicinity of the screen.

However, in the present embodiment example, a plurality of the infrared light projector apparatus 3 are provided at least as much as the number of virtual areas assumed so as to selectively project the infrared light onto areas on the screen having low brightness. Here, at least 28 of the infrared light projector apparatus 3 are required since it is assumed that the screen surface is virtually divided into 28 partial areas (4 lines×7 rows). In the present embodiment, the same number of the light sensors as the number of virtual areas, namely, 28 light sensors are provided. A proper value is determined for the number of the partial areas for each system by considering a size of the screen 2, a size or disposition method of the infrared light projector apparatus 3, or any other conditions.

The light sensor 8 is means for detecting corresponding brightness of the screen 2 based on the projection light transmitting or passing through the screen 2. As the light sensor, a photodiode or a phototransistor may be used, for example. The light sensor 8 is disposed at the rear side of the screen 2. A distance from the screen 2 to the position, at where the light sensor 8 is disposed, may differ depending on a size of the partial area corresponding to each sensor 8. For example, the sensor 8 has to be disposed closely to the rear side surface of the screen 2 so as to detect the brightness at the corresponding area precisely if the partial area has smaller size while the sensor 8 may be separated with some distance from the screen 2 if the partial area has larger size.

In a typical case, the light sensor 8 is disposed at a vicinity of the center of the corresponding partial area. This is because that a detection value of the light sensor 8 becomes a representative value of the brightness at each partial area. However, it is not necessary to be the exact center of the partial area. In case a plurality of the light sensors 8 are used for detecting brightness of single partial area, the light sensor may not be provided at the center of each partial area.

The infrared light projector apparatus 3 or the light sensor 8 described above may be disposed relatively arbitral position when a speaker is not provided in the rear side of the screen. However, when the speaker is disposed at the rear side of the screen, the infrared light projector apparatus 3 or the light sensor 8 has to be disposed so as not to interfere the replay operation.

Figure 16:
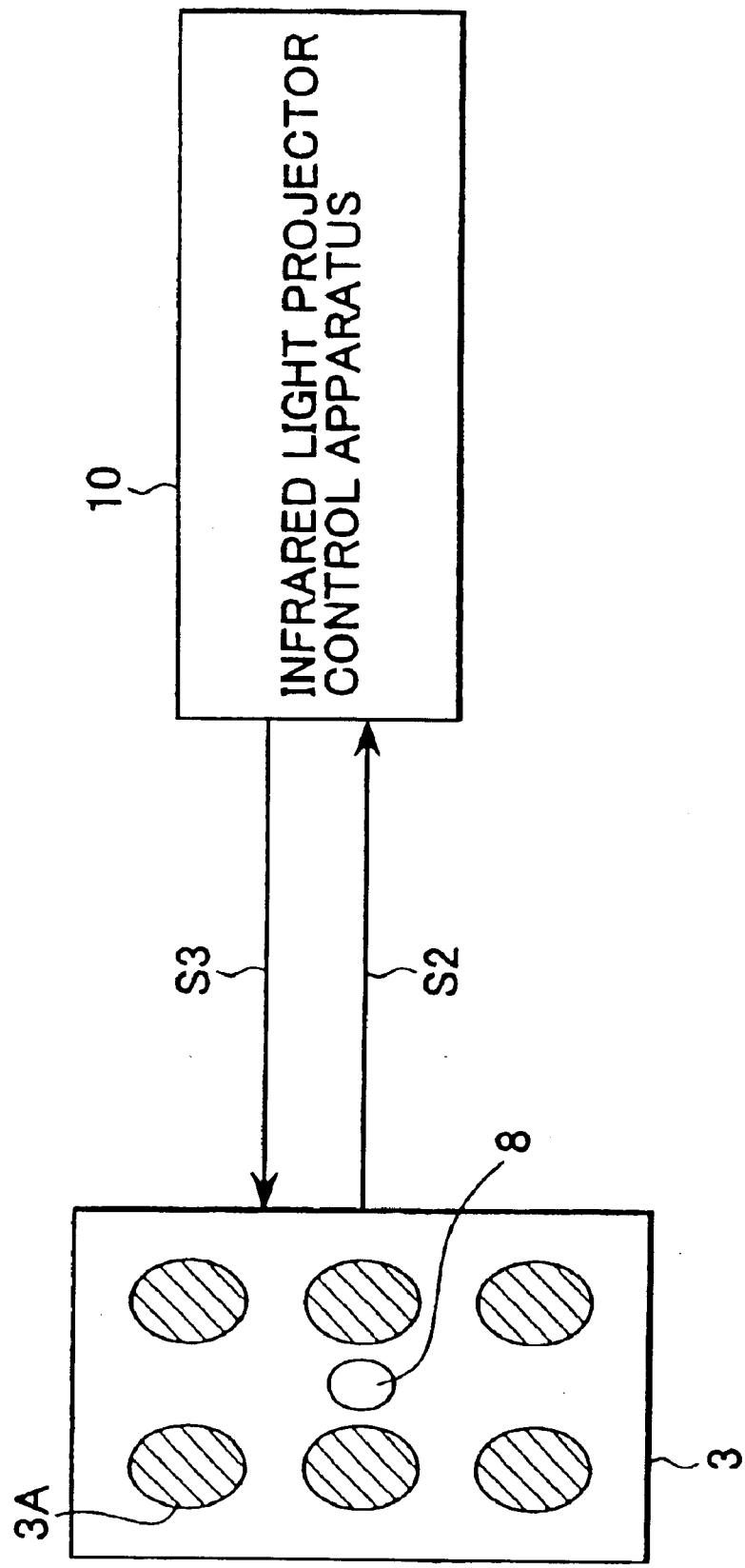
FIG. 16 is a schematic diagram illustrating an example of an infrared light projector apparatus having a unit configuration.

The infrared light projector apparatus 3 and the light sensor 8 described above may be disposed separately as independent apparatus, or may be disposed as an emission unit in an integral body as shown in FIG. 16. In a case of FIG. 16, the infrared light projector apparatus 3 is an unit apparatus in which a plurality of the infrared light emitting devices 3A (here, six units) are arrayed in a single plane. The light sensor 8 is disposed at a vicinity of the center of the infrared light projector apparatus 3. Such infrared light projector apparatus 3 may be disposed at each partial area of FIG. 15.

Further, the light sensor 8 outputs detection signals (for example, current value, voltage value) S2 in accordance with the corresponding screen brightness. Such detection signal may be an analog signal or digital signal. In a case of FIG. 16, a control signal S3 controlling the emission of the infrared light emitting device 3A is sent to the infrared light projector apparatus 3 from the infrared light projector control apparatus 10.

The shutter sensor 9 is an effective device in case that the projector apparatus 1 is a film-type projector apparatus. Accordingly, in case that a digital signal type projector is employed for the projector apparatus 1, such shutter sensor 9 does not exist in its configuration. Here, the shutter sensor 9 is used so as to project the infrared light on the screen during periods in which a shutter of the film-type projector apparatus (so-called a cinema projector) shields the projection light. That is, the shutter sensor 9 is used for detecting the periods or timings during which the shutter is closed and the screen brightness is decreased.

Figure 17:
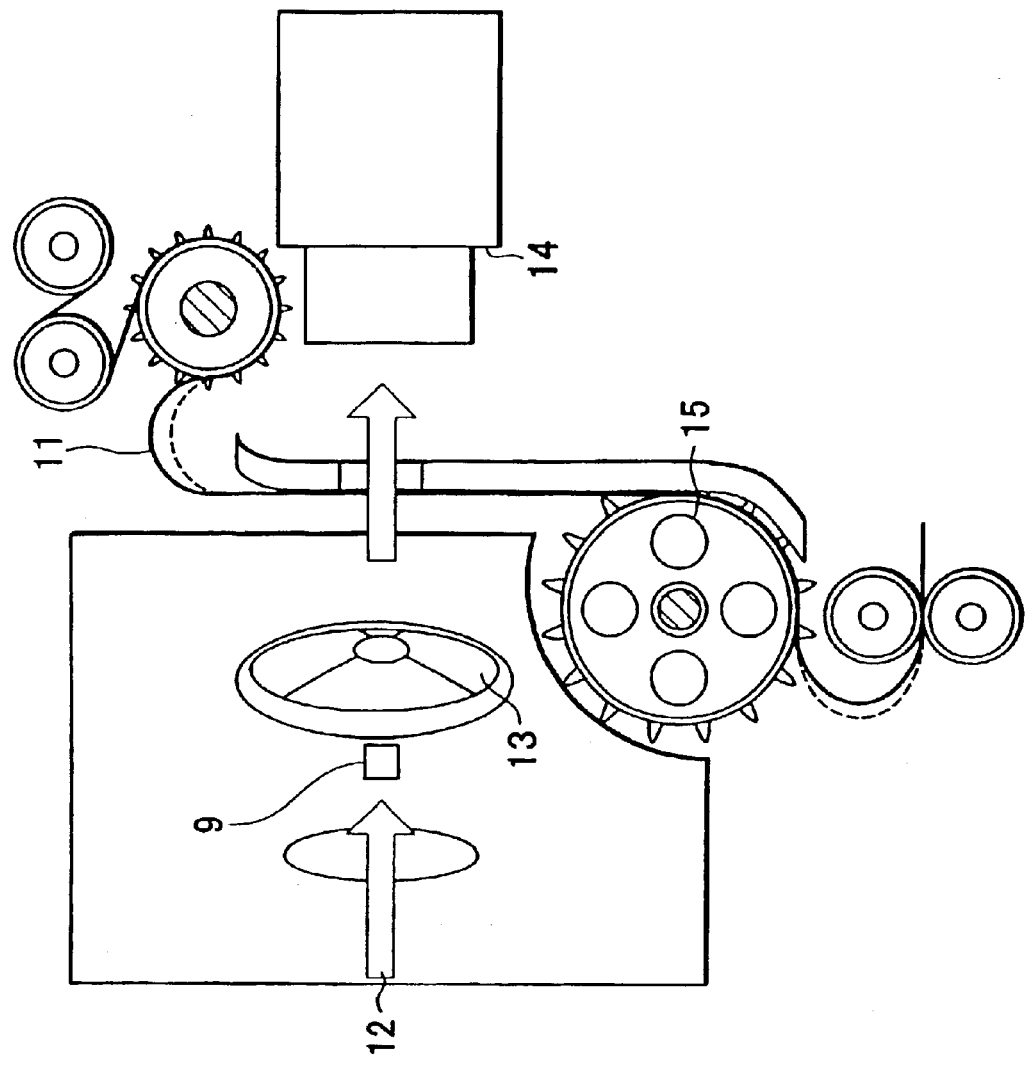
FIG. 17 is a schematic diagram illustrating an example of configuration of a film projector apparatus.

FIG. 17 shows a representative configuration example of the present function. The cinema projector projects visual images on the screen by repeating an operation of projecting the visual images onto the screen by radiating a light-source light 12 when a film 11 stays still at an aperture (film projection window of the projector) and an operation of shielding the light-source light 12 radiated on the film 11 to transfer the frames during the shielding period. A lens 14 in this figure is a projection lens to project the light-source light to the screen 2.

In general, a circular plate having cut sections is employed as the shutter 13 used for shielding the light-source light. Typically, these cut sections may be provided at two position at opposing angles of the circular plate. Typically, the circular plate rotates 24 times per second, and shields the light-source light twice in every one frame (FIG. 18(B)). An inter-sprocket 15 transfers the film 11 for one frame during one of two shielding periods which appear twice per frame to shield the light-source light (FIG. 18(A)). The infrared light projector apparatus 3 coupled with the motion timing of the shutter 13 projects the infrared light twice per frame (FIG. 18(C)).

As the shutter sensor 9, not only an optical type but also an electronic or mechanical type may be contemplated. For example, as the optical type, a method shown in FIG. 19 may be contemplated. FIG. 19 is the method for determining a positional relationship (rotational position) in which the shutter 13 shields the light-source light by detecting light flux reflected at the shutter surface. FIG. 19(A) shows a state in which the light-source light 12 is projected, 19(B) shows a state in which shielding of the shutter 13 is started, FIG. 19(C) shows a state in which the shutter 13 is shielding light-source light 12.

In case that the method of FIG. 19 is used, the shutter sensor 9 may be disposed so as that the shutter 13 is faced with a vane during the shielding of the light. As the shutter sensor 9, a light emitting diode (emission means) and a photo diode (light reception means) disposed at a plane facing the shutter 13 may be used. According to this configuration, the positional relationship of the shutter may be detected since an amount of light received by the photodiode is high during the shielding of the light-source light and the amount of light is low during the projection.

As the optical type method, there is a method for detecting the positional relationship (rotational position) of the shutter 13 by disposing the light emitting diode and the photodiode so as to face each other sandwiching the circular plate's rotation area and determining whether the light emitted from the light emitting diode is detected by the photodiode. In this case, the rotational position of the circular plate may be detected based on a light receiving timing and a light shielding timing of the light emitted to the photodiode from the light emitting diode.

Alternatively, a method for mechanically detecting a rotational position of the circular plate may be employed for the shutter sensor 9. For example, it is possible to mechanically detect the shutter's rotational position from a rotational position (position of gear) of a gear attached to a rotational axis so as to have the same axis. Further, for example, the following method may be contemplated. The method is for detecting whether the cut section or the circular plate's vane is positioned from a change in an electrostatic capacitance between electrodes disposed so as to sandwich the rotational area of the circular plate. Further, a method for detecting the shutter's rotational position from a drive information itself of the rotational axis.

Of course, the shutter sensor 9 in accordance with a form or a type of the shutter may be employed in case that the form or the type of the shutter may differ. For example, in case that open-close of the shutter is electronically controlled, it is possible to use a method for detecting a period of the light-source light shielding using the open-close signal.

The following methods may be contemplated as an utilizing method of the detection results. The methods includes a method for emitting the infrared light when the shutter's close motion is detected and a method for forecasting the shutter's close motion from the detection result and emitting the infrared light at a forecasted timing.

The infrared light projector control apparatus 10 is a mean for controlling the emission of the infrared light projector apparatus 3 (each infrared light emitting device 3A in the configuration of FIG. 16) according to a light sensor output S2 outputted from the light sensor 8 or a shutter information S4 outputted from the shutter sensor 9.

An internal configuration of the infrared light projector control apparatus 10 may differ depending of a system to which the infrared light projector control apparatus 10 is to be applied. For example, a computer (having a processing unit (having a controller and an operation device), a memory, an input/output unit) is generally used in case that the system has a configuration for simultaneously controlling all of the infrared light projector apparatus 3 as shown in FIG. 15. However, it is also possible to realize functions of programs executed by the computer as electronic circuits.

However, the infrared light projector control apparatus 10 may not be required for every case. For example, a desired prevention effect may be realized without using the control apparatus by directly using detection results of the light sensor 8 as a light amount adjusting signal for the infrared light projector apparatus 3 to increase an amount of the infrared light in a scene or area in which the screen is dark. Here, it is assumed that the detection result changes in analog form. Alternatively, a multi-valued information may be outputted as the light amount adjusting signal in case that the light sensor has a function of converting the analog signal to the digital signal.

For example, it is possible to configure a system capable of switching the infrared light projection and non-projection by directly inputting the detection results of the light sensor 8 into the infrared light projector apparatus 3 in case that the light sensor 8 has a function of determining whether the screen brightness is brighter than a predetermined reference value or not (in case that it has a comparison function of comparing the detection results and the predetermined reference value). Of course, the infrared light is projected in case that the screen brightness is equal or less than the predetermined reference value.

For example, a desired prevention effect may be realized without using the control apparatus by using the detection result of the shutter sensor 9 as an on-off control signal of the infrared light projector apparatus 3 and projecting the infrared light at a time of the frame transfer at which the screen becomes dark.

An explanation comes back to a case in which the infrared light projector control apparatus 10 is used. For example, the infrared light projector control apparatus 10 commands the infrared light projector apparatus 3 to project the infrared light by outputting the control signal S3 when the shutter's close motion (namely the infrared light is shielded) is detected by the shutter sensor 9. Here, the infrared light projector control apparatus 10 may command all of the infrared light projector apparatus (in case of FIG. 15, it is possible to command all 28 units of the infrared light projector apparatus to project). Alternatively, the infrared light projector control apparatus 10 may command a part of the infrared light projector apparatus to project the infrared light. For example, in case of FIG. 15, it may command the projection of the infrared light so as that the emission pattern becomes a check pattern. Alternatively, it is also possible to command the projection of the infrared light so as that the emission pattern forms an other recognizable graphic pattern (may include character or notation).

Figure 20A:
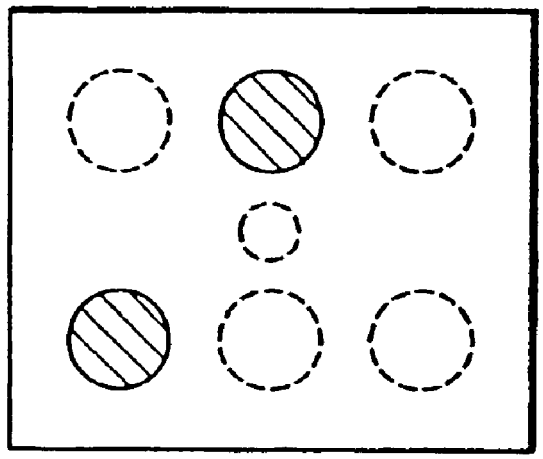
FIG. 20 is a schematic diagram illustrating an example of emission control for an infrared light projector apparatus having a unit configuration.
Figure 20B:
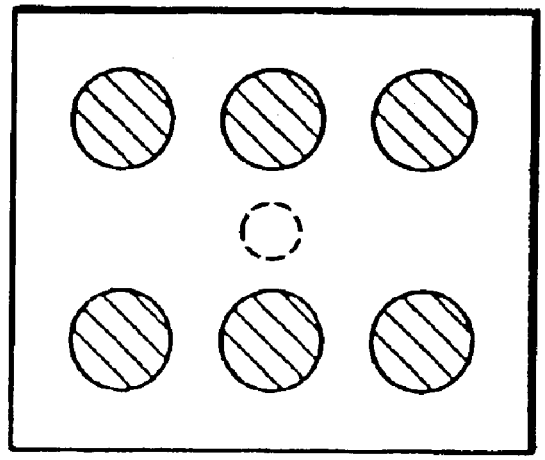

In case that the infrared light projector control apparatus 10 is configured as a group of plural infrared light emitting devices as shown in FIG. 16 and the projection command of the infrared light is sent to the infrared light projector control apparatus 10, there may be a case that the emission is ordered to all of the infrared light emitting devices as shown in FIG. 20(A), and a case that the emission is ordered to a part of the infrared light emitting devices as shown in FIG. 20(B). A more complex graphic pattern may be recorded by combining the other emission pattern of the neighboring infrared light projection apparatus 10 by controlling the emission of the infrared light emitting devices as shown in FIG. 20(B).

Next, a control operation example will now be explained for a case that the detection result of the light sensor 8 is inputted into the infrared light projector control apparatus 10. The most simple control method is a method for judging the screen brightness based on the detection output of the light sensor 8 and emission-controlling the infrared light projector apparatus 3 assigned to an area to be monitored by the light sensor when the brightness is a lower than the predetermined brightness. Of course such control function may be realized by means of software or hardware.

In case that the judgment process is executed in digital manner, the infrared light projector control apparatus 10 may be constructed to have a memory (memory means) for recording a threshold value to be a comparison reference value, a comparator (comparison means) for comparing an input value (value converted by means of converting to a digital signal in case outputs of the light sensor is the analog signal) and the above-cited threshold value, and an output unit (output means) for outputting the comparison result to corresponding infrared light projection apparatus 3. On the other hand, in case that the judgment process is executed in analog manner, the infrared light projector control apparatus 10 may be constructed to have a comparison circuit stage of a differential amplifier circuit configuration for comparing the light sensor input and a reference value (for example, generated by resistance divided voltage), and an output stage for outputting the differential output.

Here, the threshold value may be determined, for example, based on measured values or empirical values with consideration of recording characteristics of the imaging apparatus (for example, optical characteristic of a solid state imaging apparatus) or visual sense characteristic of human being. In case that a disposition density of the light sensor is relatively high, the infrared light emission does not bring much effect at the low brightness region when an output from a specific light sensor indicates relatively low brightness while an output from the other light sensors in the vicinity indicate high brightness. Accordingly, it is possible to control not to emit the infrared light when such condition is satisfied.

Even in case that the infrared light is selectively projected on to the screen areas having the low brightness, the following method may be contemplated. The method is for emitting only a part of the infrared light emitting devices corresponding to the area as shown in FIG. 20(B). In this case, a memory for recording a predetermined emission pattern and program steps for generating the emission pattern are added to the previous configuration.

The control operation described above is an operation example for a case that only one light sensor 8 is basically disposed in an area in which the infrared light is to be projected. However, the following operation method may be employed in case that a plurality of the light sensors are disposed in the area in which the infrared light is to be projected. The area in which the infrared light is to be projected may be each of the partial areas of FIG. 15, or may be a plurality of the partial areas (Maximum is a whole area of the screen).

In the following, an explanation is given in case that the whole area of the screen is considered to be the infrared light projection area since the control operations themselves are the same. That is, it will now be explained how 28 detection results are used to generate a projection command of the infrared light as shown in FIG. 15.

For example, there is a method for using the number of the light sensors 8, by which the low screen brightness are detected, as a judgment reference. The same methods described above may be applied directly here for judging whether the brightness is low or not.

In this case, the infrared light projector control apparatus 10 compares the predetermined threshold value stored in the memory and the detected value counted at every time-point counted by a counter (the number of the light sensors judged as the low brightness) with the comparator, and issues the emission command to project the infrared light on the whole screen which is the area to be projected when the detected value is bigger than the predetermined threshold value. In case that a predetermined pattern is to be formed from a plurality of light images, the infrared light projector control apparatus 10 issues the emission command only to the infrared light projection apparatus corresponding to the pattern. In this case, the infrared light projector control apparatus 10 identifies positional information of the infrared light projection apparatus corresponding to a predetermined pattern by reading out the recording apparatus, or identifies positional information of the infrared light projection apparatus corresponding to a predetermined pattern by calculation.

Regarding to the judgment reference, there is a method for using a position of the light sensor 8 that detected the low screen brightness. For example, there is a method for using the output of the light sensor 8 disposed in a vicinity of the screen center as an object to be judged. There is an advantage of ascertain the recording of the infrared light at the center part of the screen since a vicinity of the screen center is visually a highly visible part. Alternatively, there is a method for using the output of the light sensor 8 disposed in a vicinity of the screen surrounding (for example, screen's outer periphery, one of four corners, all of four corners, or the like) as an object to be judged. Although the prevention effect may be limited at the screen surrounding compared to the center part, a certain prevention effect may be anticipated since the rest of the area (including the screen center) is often also dark when the surrounding to be judged is dark. Further, ample prevention effect may be realized by letting the infrared light images appear very often even the appearance position is at the surrounding.

Further, for example, the following method or the like may be contemplated. The method is for using the output of the light sensor 8 disposed at a plurality of judgment points set up on the screen (for example, five points comprising four corners of the screen and the center part) as objects to be judged. Although it depends on the number of the measurement points and a set-up method, the infrared light may be projected at least on the dark area of the screen. In case of fixing the judgment point as described above, the light sensors 8 may be disposed only at these judgment points.

In the above described example, the emission of the infrared light is basically controlled by judging whether the low brightness is detected at the judgment area or point. However, in case that a plurality of the light sensors 8 are disposed at single judgment area or point, the judgment of the low output may be performed regarding to the judgment area or point only when the number of the light sensors, from which the judgment of the low brightness is obtained, is larger than a predetermined number.

In the above described example, the detection results regarding the judgment points are used as judgment elements. However, the judgment on whether the infrared light should be projected or not may be performed based on a distribution pattern of the light sensors in which the judgment result of the low brightness is obtained while using all the light sensors disposed at the rear side of the screen as the judgment elements. In this case, there are provided a distribution pattern for triggering the infrared light projection and a distribution pattern for not triggering the infrared light projection, or, one of those distribution patterns. And the judgment of whether the infrared light is projected or not may also be performed according to a degree of coincidence with the distribution pattern.

The infrared light projector control apparatus in this case may further comprises a memory for recording the distribution pattern for the judgment, a distribution pattern recording an actual measurement distribution pattern of the light sensors in which the detection result of the low brightness is obtained, and a judgment unit for judging the degree of coincidence between these.

Of course, in case that the infrared light projection is performed as a result of the judgment, the above cited techniques may be applicable to operations for forming a predetermined pattern from the a plurality of the light images.

As in the present embodiment example, it is possible to ascertain the recording of the infrared light into the imaging apparatus of a person conducting the unauthorized act by selectively projecting the infrared light onto scenes or areas in which the screen brightness is low since the infrared light is projected onto the scenes or areas in which the brightness of the infrared light images becomes certainly higher than the visual images of the main feature program. Particularly, in case that the area to which the individual light image is projected is limited to a relatively small area as shown in FIG. 15, an output level may be a small value in the infrared light projector apparatus itself since the brightness of the light image on the screen may be increased as much as the spreading of the light flux is tightened.

Further, it is possible to prolong the product life time and the power consumption since the infrared light is emitted only in the scene or area in which the prevention effect is discernible.

(7) Seventh Embodiment Example

The seventh embodiment example is shown in FIG. 21. This embodiment example is a modification example of the sixth embodiment example. Accordingly, the same applies to points of projecting the infrared light onto the scene in which the screen brightness is low or selectively projecting to the area of the screen surface in which brightness is low, in order to increase the prevention effect of the infrared light.

However, the present embodiment example and the sixth embodiment example are different in a method for acquiring information regarding the scene or time-point in which the screen brightness decreases. That is, the present embodiment example differs from the sixth embodiment example on a point of acquiring information of time-point in which an average brightness of the screen decreases (time information) or information regarding partial area and time-point in which the screen brightness decreases (namely, position information and time information), from a recording medium or via a network.

Accordingly, no light sensor is required in the present embodiment example. The basic configuration is the same as the sixth embodiment example. Accordingly, the screen configuration and the disposition of the infrared light projector apparatus are similar to the sixth embodiment example. Although the infrared light projector apparatus 3 is disposed in the rear side of the screen 2, the projection may also be done from the front side of the screen 2.

A program server 16 is an apparatus to output visual image data S5 to the projector apparatus 1. Here, there may be cases that the visual image data S5 is data read out from a recording medium 17 (for example, video tape, CD-ROM, DVD or the like) or that the visual image data S5 is data being distributed via a network 18. However, such visual image data S5 is not outputted in case that the projector apparatus 1 is a film type projector apparatus.

The program server 16 also functions as an apparatus replaying the time information or the position information of the partial area suited for projecting the infrared light from the recording medium 17, or receiving those information via the network 18. That is, the program server 16 also functions as an apparatus outputting an infrared light projection control data S6 to the infrared light projector control apparatus 10. The recording medium may be one provided through a mail service or a package delivery service, or one recording data distributed via the network 18 in advance.

Here, a synchronization between the visual image data S5 to be outputted to the projector apparatus 1 and the infrared light projection control data S6 to be outputted to the infrared light projector control apparatus 10 is performed by the program server 16. Of course, in case that the digital type projection system as shown in FIG. 21, the synchronization between data is controlled based on the common synchronization information or the time information for reproduction. In case that the projector apparatus 1 is the film type, an output timing of the infrared light projection control data S6 is controlled based on the synchronization signal or the position information read out from the film, or the rotational position information of the shutter 13.

The following cases may be contemplated for the infrared light projection control signal S6. The case may be a case in which the infrared light projection control signal S6 includes only the time-point information wherein the screen brightness decreases (time information), a case in which the infrared light projection control signal S6 includes the partial area and the time-point information wherein the screen brightness decreases (namely, position information and time information), or a case combining these cases.

For example, in case the projector apparatus 1 is a digital type apparatus, it is possible to contemplate that the infrared light projection control data S6 may be information of a time-point in which the light-source light is shielded with the shutter 13, information of a pre-detected time-point in which an average screen brightness decreases (depending on contents of the visual images), information of a pre-detected time-point in which the screen brightness decreases partially (depending on contents of the visual images).

Alternatively, in case the projector apparatus 1 is a digital type apparatus, it is possible to contemplate that the infrared light projection control data S6 may be information of a pre-detected time-point in which an average screen brightness decreases (depending on contents of the visual images), information of a pre-detected time-point in which the screen brightness decreases partially (depending on contents of the visual images).

The infrared light projector control apparatus 10 is means for specifically controlling the emission of the infrared light projector apparatus 3 in practice. As similar to the sixth embodiment example, the infrared light projector control apparatus 10 may command all of the infrared light projector apparatus 3 to project the infrared light, or, may command only a part of the infrared light projector apparatus 3 to project the infrared light. Of course, in case the infrared light projector apparatus 3 is configured as a group of plural infrared light emitting devices as shown in FIG. 16, all of the plural infrared light emitting devices may be emitted, or, only a part of them may be controlled to emitted.

Also in the present embodiment example, it is possible to ascertain the recording of the infrared light into the imaging apparatus of a person conducting the unauthorized act by selectively projecting the infrared light onto scenes or areas in which the screen brightness is low since the infrared light is projected onto the scenes or areas in which the brightness of the infrared light images becomes certainly higher than the visual images of the main feature program. Particularly, in case that the area to which the individual light image is projected is limited to a relatively small area as shown in FIG. 21, an output level may be a small value in the infrared light projector apparatus itself since the brightness of the light image on the screen may be increased as much as the spreading of the light flux is tightened.

Further, it is possible to prolong the product life time and the power consumption since the infrared light is emitted only in the scene or area in which the prevention effect is discernible.

(8) Eighth Embodiment Example

Figure 22:
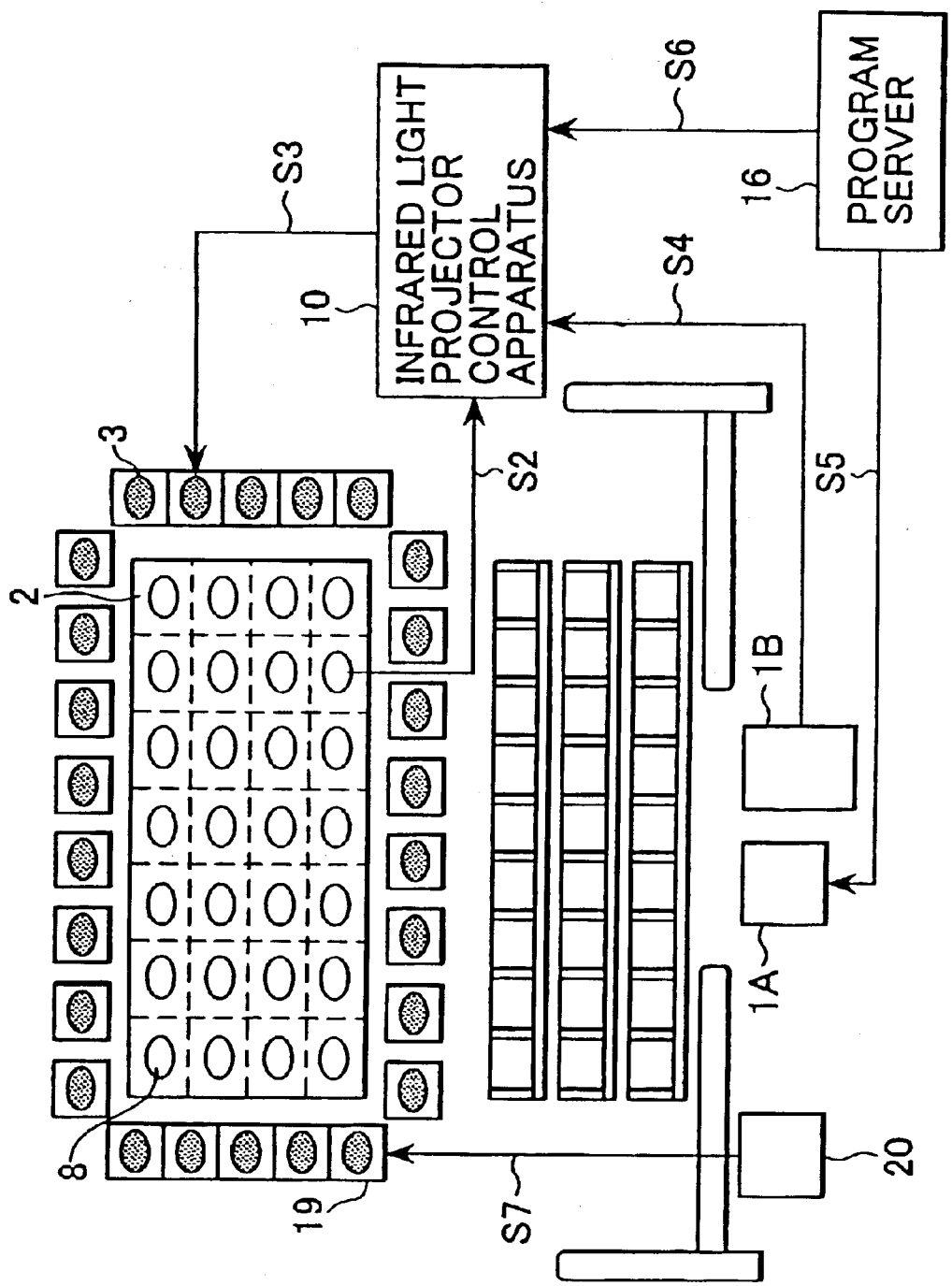
FIG. 22 is a schematic diagram illustrating one embodiment wherein infrared light from a vicinity of a screen.

The eighth embodiment example is shown in FIG. 22. This embodiment example relates to a novel feature of increasing the amount of the infrared light reflected at the screen surface to an value more than that of an conventional system by disposing the infrared light projector apparatus 3 at a vicinity position in the front side of the screen and projecting the infrared light to the screen from the infrared light projector apparatus 3.

FIG. 22 represents a composite system comprising the present embodiment and the above described sixth embodiment example (the novel feature of controlling the emission timing of the infrared light base on the shutter information) or the above described seventh embodiment example (the novel feature of controlling the emission timing of the infrared light base on the infrared light projection control data).

Further, the present embodiment example is an application example of a novel feature of automatically adjusting the infrared light projecting direction in accordance with a change of the screen size depending on the contents.

FIG. 22 also shows an example applicable for a movie theater or other theater systems. Of course, as similar to the other embodiment examples, the technique itself may be applicable to a home theater. In any cases, the visual images projected onto the screen include television programs and the other copyrighted products as well as a movie.

First, a disposition method of the infrared light projector apparatus 3, that is unique for the present embodiment example, may be explained. For example, as shown in FIG. 22, the infrared light projector apparatus 3 is disposed somewhat front side of the screen periphery part (for example, screen frame or outer border area). In this case, the infrared light is projected within a range from an angle close to the horizontal direction to an angle close to the vertical direction depending on a projection position on the screen surface, and the infrared light randomly reflected on the screen or the like incident into the imaging apparatus of a person conducting the unauthorized act. The incident angle of the infrared light is determined according to a size of the screen 2 or the disposition location of the infrared light projector apparatus 3, and not limited to any particular ranges.

FIG. 22 shows eight units of the infrared light projector apparatus 3 disposed along the top and the bottom rims for the longer rims (transversal direction) and five units of the infrared light projector apparatus 3 disposed along the right and the left rims for the shorter rims (vertical direction). However, the infrared light projector apparatus 3 may be disposed along only one of the rims, or the infrared light projector apparatus 3 may be disposed along any two arbitrary rims, or the infrared light projector apparatus 3 may be disposed along any three arbitrary rims. Of course, any arbitrary number of the infrared light projector apparatus 3 may be disposed.

In case that the infrared light projector apparatus 3 is disposed in a vicinity of the screen 2, the infrared light projector apparatus 3 may be disposed at not only the screen periphery part but also a point closer to the screen than the midpoint of the projector apparatus 1 and the screen 2. For example, the disposition location of the infrared light projector apparatus 3 may be at L/3, L/4, L/5 from the screen where L is a distance between the projector apparatus and the screen.

Next, characteristic apparatus among the system shown in FIG. 22 will now be explained. Explanations of the other apparatus examples are omitted since those are common to the other embodiment examples. There are two characteristic apparatus. Those are a projector directing actuator apparatus 19 and a screen mask switching apparatus 20. Those are apparatus for auto-adjusting a projection position or direction of the infrared light automatically coupled to the switching of the screen size in case that there are a plurality of the screen sizes suited for the projected visual images.

Figure 23:
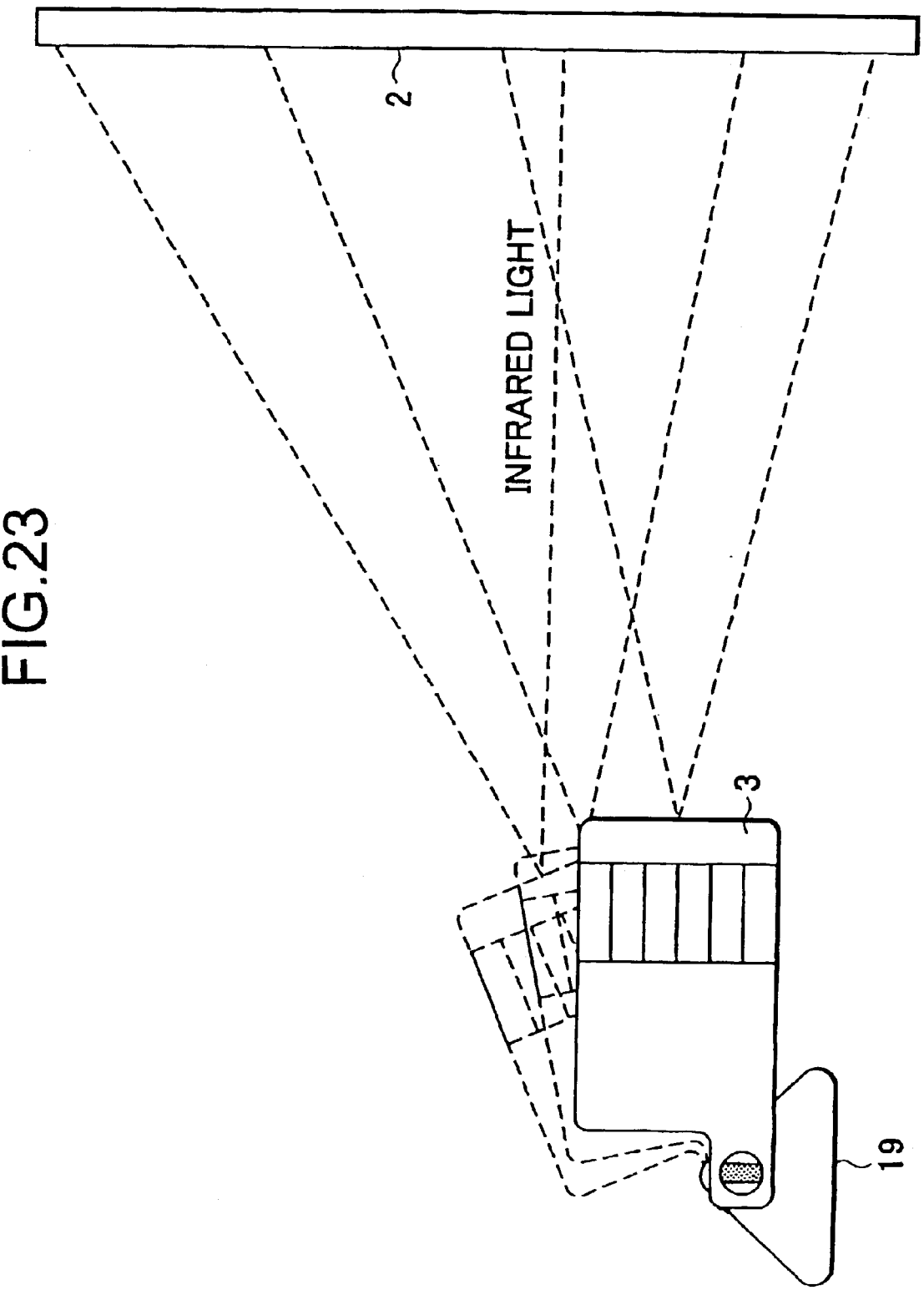
FIG. 23 is a schematic diagram illustrating an example of configuration of an infrared light projector apparatus attached with an projection directing actuator.

FIG. 23 shows an attachment example of the infrared light projector apparatus 3 to the projector directing actuator apparatus 19. FIG. 23 represents a state in which the projector directing actuator apparatus 19 is turnably attached on the backside of the infrared light projector apparatus 3 (opposite side to the infrared light projecting direction).

Here, the turning axis is orthogonal to the optical axis. The infrared light projector apparatus 3 is coupled to the projector directing actuator apparatus 19 through a motor and a gear, and attached so as to turn a predetermined angle in a predetermined direction in accordance with an amount of the motor rotation.

The actuator apparatus is not limited to a technique transferring power by an amount of rotation but also one transferring the power with an amount of linear motion. Further, the infrared light projector apparatus 3 may be an object to be directly driven by the actuator apparatus, or may be an object to be indirectly driven through a gear or rubber or any other coupling devices by the actuator apparatus. In case of FIG. 23, the moving direction is only one. However, it may be constructed to have two movable directions. For example, it may have two movable directions, the horizontal direction and the vertical direction.

The screen mask switching apparatus 20 is means for automatically providing an actuator control information of the infrared light projector apparatus to the projector directing actuator apparatus 19 according to a command of the screen size switching. For example, the screen mask switching apparatus 20 comprises a memory unit for recording screen sizes and information regarding a projecting direction of each infrared light projector apparatus suited for the corresponding screen size (for example, information regarding projecting direction or angle), and a control unit reading out a numerical value suited for the screen size after the switching from the memory unit and outputting the numerical value to each position of the projector directing actuator apparatus 19. Alternatively, the information to be outputted to the projector directing actuator apparatus 19 may be provided by calculating an adjusting amount with respect to the current value (differentiation value) in case that a target value (optimum value) itself is not provided like the present example. One of these data may be outputted as a control data S7 from the screen mask switching apparatus 20 to the projector directing actuator apparatus 19.

The switching command of the screen size or the optimum screen size information may be provided in conjunction with a manual operation of an operator in one case, or may be automatically provided based on information recorded in association with a visual image content in the other case. For example, in case of a movie theater, a person in charge at the theater side operates a button to change a position of a blackout curtain (mask) when the screen size (aspect ratio) is switched. Such button operation may be shared for switching the projecting direction. In case the recorded information is used as in the latter case, it is possible to contemplate a case in which the optimum information is recorded in a medium recording the visual image contents, and the other case in which a corresponding chart is recorded in the other recording medium separated from the visual image contents.

Although FIG. 22 shows the projector directing actuator apparatus 19 and the screen mask switching apparatus 20 as separated apparatus, these may be constructed as single apparatus. Further, the adjustment of the infrared light projecting direction may be done not only for individual infrared light projector apparatus but also for a row unit or a unit of neighboring plural infrared light projector apparatus.

It is possible to further increase the prevention effect against the unauthorized imaging act since an amount of the reflection light may be increased remarkably in comparison with an conventional system by projecting the infrared light to the screen from the vicinity position of the screen so as that the reflected light may be incident into the imaging apparatus of a person conducting the unauthorized act, as in the present embodiment example. Further, an effect of deteriorating the quality of visual images imaged in the unauthorized manner may be promoted by combining the technique of selectively projecting the infrared light onto the scene where the screen brightness decreases or the area of the low brightness. Of course, it is possible to ascertain the recording of a desired information by combining the intermittent projection or the selectively projection techniques at a time of infrared light projection.

Further, it is possible to effectively avoid an event in which the infrared light is projected at outside of the visual image content projecting area by automatically adjusting the infrared light projecting direction according to the screen size, as in the present embodiment example. Namely, it is possible to increase the prevention effect by most effectively utilizing the available infrared light projector apparatus.

In the above, the explanation is given to a composite system comprising a portion projecting the infrared light from the front side vicinity of the screen, a portion relating the automatic adjustment function of the projecting direction, and a portion relating to selective projection technique at the low brightness area or scene. However, it is possible to contemplate a system configuration including only the portion projecting the infrared light from the front side vicinity of the screen, or a system configuration including only the portion relating to the automatic adjusting function of the projecting direction.

(9) Ninth Embodiment Example

In each of the above described embodiments, representative examples are described for the specific examples of the conceptual embodiment examples. However, it is possible to contemplate various embodiment examples such as composite systems of the above described embodiment examples or modification examples or the like.

According to the embodiments according to the present invention described in the present specification, the following effects may be realized.

(A) It is possible to have projected infrared light effectively incident into imaging apparatus of a person conducting the unauthorized act since infrared light is projected to a viewer/audience direction from one or more infrared light projector apparatus disposed at a screen side to allow the infrared light incident into the imaging apparatus of a person conducting the unauthorized act. Accordingly, the embodiment may produce ample prevention effect even when the low power infrared light projector apparatus is used.

(B) It is possible to have projected infrared light effectively incident into imaging apparatus of a person conducting the unauthorized act since infrared light is actively reflected by an infrared light reflection mirror so as that the reflected infrared light incident into imaging apparatus of a person conducting the unauthorized act. Accordingly, the embodiment may produce ample prevention effect even when the low power infrared light projector apparatus is used.

(C) Following effects may be realized by intermittently emitting infrared light. For example, a location in which the unauthorized act was taken place may be identified from the image obtained through the unauthorized manner by outputting the infrared light in accordance with a predetermined information. For another example, the viewing may become very difficult due to rapid change of brightness level by frequently changing emission intensity of infrared light.

(D) Prevention effect may be intensified further by selectively projecting onto a part of the screen surface, in which brightness is lower (for example, area or time period having a brightness of the screen surface equal or less than a predetermined value) whereby increasing relative effects of the infrared light. Further, in case that certain information is superposed on the infrared light, such information may be surely recorded.

(E) Prevention effect may be intensified further by projecting infrared light to the screen from at least one or more infrared light projector apparatus disposed in the vicinity of the screen whereby significantly increasing an amount of infrared light reflected on the screen, which may be incident into imaging apparatus of a person conducting the unauthorized act.

While the present invention has been particularly shown and described with reference to the embodiments according to the present invention, it will be understood by those skilled in the art that combination of the embodiments and/or other changes in form and details can be made therein without departing from the essential character thereof.

What is claimed is:

1. An imaging prevention method for interfering unauthorized imaging of a number of visual images projected on a screen, characterized by directly projecting infrared light to a viewer/audience side from at least one or more infrared light projector means;

said at least one or more infrared light projector means being disposed in a near proximity or close proximity of the screen;

whereby enabling said infrared light to be directly incident into imaging means performing an unauthorized copying act so as to adversely affect the unauthorized copying operations thereof.

2. An imaging prevention method for interfering unauthorized imaging of a number of visual images projected on a screen, characterized by reflecting infrared light by infrared reflection means to a viewer/audience side whereby enabling said infrared light to be directly incident into imaging means performing an unauthorized copying act so as to adversely affect the unauthorized copying operations thereof;

said infrared light being projected from at least one or more infrared light projector means.

3. An imaging prevention method for interfering unauthorized imaging of a number of visual image images projected on a screen, characterized by reflecting infrared light by infrared reflection means to a viewer/audience side whereby enabling said infrared light to be directly incident into imaging means of a person conducting the unauthorized act;

said infrared light being projected from at least one or more infrared light projector means;

driving said infrared light reflection means with actuator means to variably control a reflection direction whereby scanning the viewer/audience side with reflection light reflected by said infrared light reflection means.

4. An imaging prevention method for interfering unauthorized imaging of a number of visual images projected on a screen, characterized by projecting infrared light from at least one or more infrared light projector means disposed in near proximity or close proximity of the screen;

whereby enabling said infrared light reflected on the screen to be directly incident into imaging means performing an unauthorized copying act so as to adversely affect the unauthorized copying operations thereof.

5. An imaging prevention method for interfering unauthorized imaging of visual image projected on a screen, characterized by automatically adjusting a projection direction of at least one or more infrared light projector means in correspondence with size change of the screen, said at least one or more infrared light projector means being disposed in a near proximity or close proximity of the screen; and projecting infrared light to the adjusted projection direction;

whereby enabling said infrared light reflected on the screen to be directly incident into imaging means performing an unauthorized copying act.

6. An imaging prevention system for interfering unauthorized imaging of a number of visual images projected on a screen, characterized by disposing at least one or more infrared light projector means in a near proximity or close proximity of the screen so that said infrared light is directly incident into imaging means performing an unauthorized copying act so as to adversely affect the unauthorized copying operations thereof.

7. An imaging prevention system for interfering unauthorized imaging of a number of visual images projected on a screen, characterized by comprising:

at least one or more infrared light projector means for projecting infrared light;

reproducing means for reproducing time information, in which brightness at the screen becomes equal or less than a predetermined brightness value, from a recording medium; and an infrared light projection control unit for controlling projection of infrared light from said at least one or more infrared light projector means in accordance with the reproduced information;

whereby enabling said infrared light reflected on the screen to be directly incident into imaging means performing an unauthorized copying act so as to adversely affect the unauthorized copying operations thereof.

8. An imaging prevention system for interfering unauthorized imaging of a number of visual images projected on a screen, characterized by comprising:

at least one or more infrared light projector means for projecting infrared light;

reproducing means for reproducing area and time information, in which brightness at the screen becomes equal or less than a predetermined brightness value, from a recording medium; and an infrared light projection control unit for controlling individually projection of infrared light from said at least one or more infrared light projector means associated with corresponding areas on the screen in accordance with the reproduced information;

whereby enabling said infrared light reflected on the screen to be directly incident into imaging means performing an unauthorized copying act so as to adversely affect the unauthorized copying operations thereof.

9. An imaging prevention system for interfering unauthorized imaging of a number of visual images projected on a screen, characterized by comprising:

at least one or more infrared light projector means for projecting infrared light;

receiving means for receiving information from a network for time in which brightness at the screen becomes equal or less than a predetermined brightness value in synchronization with the projection of said visual image; and an infrared light projection control unit for controlling projection of infrared light from said at least one or more infrared light projector means in accordance with the received information;

whereby enabling said infrared light reflected on the screen to be directly incident into imaging means performing an unauthorized copying act so as to adversely affect the unauthorized copying operations thereof.

10. An imaging prevention system for interfering unauthorized imaging of a number of visual images projected on a screen, characterized by comprising:

at least one or more infrared light projector means for projecting infrared light;

receiving means for receiving information from a network for area and time in which brightness at the screen becomes equal or less than a predetermined brightness value in synchronization with the projection of said visual image, and an infrared light projection control unit for individually controlling projection of infrared light from said at least one or more infrared light projector means associated with corresponding areas on the screen in accordance with the received information;

whereby enabling said infrared light reflected on the screen to be directly incident into imaging means performing an unauthorized copying act so as to adversely affect the unauthorized copying operations thereof.

11. An imaging prevention system for interfering unauthorized imaging of a number of visual images projected on a screen, characterized by disposing at least one or more infrared light projector means in a near proximity or close proximity of the screen surface at a front side of the screen viewing from a viewer/audience so as said infrared light reflected on the screen incident into imaging means performing an unauthorized copying act so as to adversely affect the unauthorized copying operations thereof.

12. An imaging prevention system for interfering unauthorized imaging of visual image projected on a screen, characterized by comprising:

at least one or more infrared light projector means disposed in a near proximity or close proximity of the screen surface for projecting infrared light to the screen;

projecting direction actuator means for driving said infrared light projector means to vary its projection direction;

memory means for recording projecting direction information of each infrared light projector means according to a screen size; and projecting direction control means for reading out said projecting direction information from said memory means when an instruction to change the screen size is detected, for providing the read-out information to said projecting direction actuator means, and for automatically adjusting a projecting direction of said infrared light projector means.

13. An apparatus for interfering with an unauthorized imaging device which is performing unauthorized imaging of one or more visual images appearing on a screen, the apparatus comprising:

means for detecting said unauthorized imaging device when unauthorized copying of one or more images on said screen is being performed;

an infrared light projector comprising a plurality of light emitting devices disposed in an array format for projecting infrared light; and a control unit controlling said light emitting devices.

14. An apparatus for interfering with an unauthorized imaging device which is performing unauthorized imaging of one or more visual images appearing on a screen, the apparatus comprising:

means for detecting said unauthorized imaging device when unauthorized copying of one or more images on said screen is being performed;

an infrared light projector projecting infrared light;

a light sensor detecting brightness of said screen; and a control unit controlling said infrared light projector in accordance with a detection result of said light sensor.

* * * * *